United States Patent
Miyairi et al.

(10) Patent No.: US 11,511,596 B2
(45) Date of Patent: Nov. 29, 2022

(54) COOL AIR/WARM AIR GENERATION SYSTEM

(71) Applicant: NGK Insulators, Ltd., Nagoya (JP)

(72) Inventors: Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 812 days.

(21) Appl. No.: 16/506,194

(22) Filed: Jul. 9, 2019

(65) Prior Publication Data

US 2019/0329625 A1 Oct. 31, 2019

Related U.S. Application Data

(63) Continuation of application No. PCT/JP2017/039341, filed on Oct. 31, 2017.

(30) Foreign Application Priority Data

Feb. 10, 2017 (JP) .............................. JP2017-023516
Mar. 15, 2017 (JP) .............................. JP2017-049353

(51) Int. Cl.
 *B60H 1/00* (2006.01)
 *B60H 1/32* (2006.01)
 (Continued)

(52) U.S. Cl.
 CPC ..... *B60H 1/00392* (2013.01); *B60H 1/00428* (2013.01); *B60H 1/32* (2013.01);
 (Continued)

(58) Field of Classification Search
 CPC .. B60H 1/00392; B60H 1/00428; B60H 1/32; B60H 2001/00961; B60H 2001/3292; B60H 1/00899; F25B 9/145; F03G 7/00
 See application file for complete search history.

(56) References Cited

U.S. PATENT DOCUMENTS

2013/0298547 A1* 11/2013 Yamamoto ................ F25B 9/14
 60/517
2015/0076963 A1* 3/2015 Sipp ........................ H02N 2/18
 310/316.01

(Continued)

FOREIGN PATENT DOCUMENTS

JP 2000-088378 A1 3/2000
JP 2000-205677 A1 7/2000

(Continued)

OTHER PUBLICATIONS

International Search Report and Written Opinion (Application No. PCT/JP2017/039341) dated Jan. 30, 2018.

*Primary Examiner* — Kun Kai Ma

(74) *Attorney, Agent, or Firm* — Burr & Brown, PLLC

(57) ABSTRACT

An acoustic wave generation unit oscillates working fluid of 35 atm or less so as to generate acoustic waves with a frequency in a range from 50 Hz or more and 500 Hz or less. A heat/acoustic wave conversion component has a partition wall of 5.0 W/mK or less between two end faces which defines a plurality of cells of 620 cells/cm² or more and 3100 cells/cm² or less. A heat exchanger disposed close to one end face receives heat from a first external air flowing into the heat exchanger and gives the heat to the one end face so as to flow out a cold air. Another heat exchanger disposed close to the other end face receives heat from the other end face and gives the heat to a second external air flowing into the another heat exchanger so as to flow out a warm air.

7 Claims, 10 Drawing Sheets

(51) Int. Cl.
*F03G 7/00* (2006.01)
*F25B 9/14* (2006.01)

(52) U.S. Cl.
CPC ............... *F03G 7/00* (2013.01); *F25B 9/145* (2013.01); *B60H 2001/00961* (2019.05); *B60H 2001/3292* (2013.01)

(56) References Cited

U.S. PATENT DOCUMENTS

| | | | | |
|---|---|---|---|---|
| 2015/0226188 A1* | 8/2015 | Miyairi | ................ | B32B 15/043 156/308.2 |
| 2015/0253043 A1* | 9/2015 | Miyairi | ................... | F25B 9/145 62/6 |
| 2015/0281849 A1* | 10/2015 | Miwa | ..................... | H04R 31/00 29/896.2 |
| 2016/0084198 A1* | 3/2016 | Miyairi | ................... | F02G 1/043 60/516 |
| 2016/0084237 A1* | 3/2016 | Miyairi | ..................... | F03G 7/00 29/890.03 |
| 2016/0084238 A1* | 3/2016 | Miyairi | ................. | F02G 1/0435 60/530 |
| 2016/0084239 A1* | 3/2016 | Miyairi | ................... | F03G 7/002 60/530 |
| 2016/0090970 A1* | 3/2016 | Miyairi | ..................... | F03G 7/00 60/530 |
| 2016/0131114 A1* | 5/2016 | Miyairi | ..................... | F03G 3/00 60/516 |

FOREIGN PATENT DOCUMENTS

| | | | | |
|---|---|---|---|---|
| JP | 2006-214406 A1 | 8/2006 | | |
| JP | 2010-236744 A1 | 10/2010 | | |
| JP | 2011-195021 A1 | 10/2011 | | |
| JP | 2012-229892 A1 | 11/2012 | | |
| JP | 2013-050087 A1 | 3/2013 | | |
| JP | 2013117171 A | * | 6/2013 | |
| JP | 2013117318 A | * | 6/2013 | |
| JP | 2013117319 A | * | 6/2013 | |
| JP | 2013213459 A | * | 10/2013 | ............. F04F 1/02 |
| JP | 2013-234820 A1 | 11/2013 | | |
| WO | WO-2017212871 A1 | * | 12/2017 | ............. F02G 1/055 |

* cited by examiner

COOL AIR/WARM AIR GENERATION SYSTEM

TECHNICAL FIELD

The present invention relates to cool air/warm air generation systems to cool and warm the cabin in an electric vehicle.

BACKGROUND ART

Society as a whole has been recently becoming more demanding in reducing of greenhouse gases, such as carbon-dioxide. In response to such a demand, techniques have been developed actively also in the field of vehicles to replace fossil-powered vehicles with electric vehicles.

Electric vehicles do not burn fossil fuels and so can reduce emissions of greenhouse gas, such as carbon-dioxide. Electric vehicles, however, may fail to obtain waste heat from the engine as the heat source. For instance, unlike vehicles that burn fossil fuels, waste heat from the engine is not available as the heat source for heating a cabin in electric vehicles. Electric vehicles therefore need to have another heat source for heating the cabin. A simple method to obtain the heat for heating may be heat generation by passing the electricity as the driving source of electric vehicles through a heating wire, for example. This method is not favorable because it requires a considerable amount of electricity for heating, and so has very low energy-efficiency.

The sector of electric vehicles therefore typically uses a method of drawing heat from the external air with a heat pump to generate air warmer than the external air, and heating the cabin with this warm air (see Patent Document 1, for example). Such a method of drawing heat from the external air actually generates warm air for heating with less electricity than the method of directly generating heat by passing electricity through a heating wire. A heat pump generates cool air that is cooler than the external air as well as the warm air. This cool air may be used instead of warm air for cooling.

Such a heat pump typically is configured to compress or expand working fluid so as to allow the working fluid to release and absorb heat. A complex mechanism is typically required to compress or expand the working fluid, and this method including a heat pump therefore has a problem of increasing the size of the heat pump device as a whole. Many of working fluids used for such a heat pump are gases which are suitable for the viewpoint of energy efficiency, but have a high global warming potential and so adversely affect global warming. A heat pump including such a gas therefore does not meet the need of reducing greenhouse gases from society as a whole. As a result, there is an additional problem that it is difficult to select working fluid so as to improve the energy efficiency while meeting the need of reducing greenhouse gases.

Meanwhile, there has been known a heat pump based on a thermoacoustic effect, as another type of heat pumps which is different in the method of drawing heat from the above-stated heat pump for heating electric vehicles (see Patent Document 2, for example). A thermoacoustic effect refers to a phenomenon that a temperature gradient at both ends of a thin tube causes an acoustic-wave transmitting medium (working fluid) in the thin tube to oscillate so that acoustic waves are transmitted, or its converse phenomenon that a temperature gradient at both ends of a thin tube is formed by acoustic waves transmitted in the thin tube. Particularly the latter phenomenon in which a temperature gradient is formed by acoustic waves can be considered as a phenomenon in which heat is transmitted from one end to the other end of a thin tube, and it is possible to form a heat pump based on this phenomenon. Such a heat pump based on a thermoacoustic effect does not need a mechanical device to compress and expand the working fluid. This heat pump therefore is suitable for decreasing the size of the heat pump as a whole as compared with a heat pump configured to compress and expand the working fluid. In addition, in such a heat pump based on a thermoacoustic effect, it is not necessary to use a gas having a high global warming potential as the working fluid. On the contrary, a working fluid having low responsiveness (e.g., rare gas), rather than a gas having a high global warming potential, can achieve higher energy-efficiency. A heat pump based on a thermoacoustic effect therefore is suitable to improve the energy efficiency without adversely affect the environment. Considering these advantages of the heat pump based on a thermoacoustic effect, such a heat pump based on thermoacoustic effect may be used as the heat pump for heating (and cooling) for electric vehicles as well.

CITATION LIST

Patent Documents

[Patent Document 1] JP 2011-195021
[Patent Document 2] JP 2000-088378

SUMMARY OF THE INVENTION

Problem to be Solved by the Invention

However, a heat pump based on a thermoacoustic effect has a problem that noise due to acoustic waves in the heat pump is transmitted to the outside of the heat pump, and this noise may be often annoyance and unpleasant to the ear. Electric vehicles especially have engine sound smaller than in an vehicle burning fossil fuels. Such noise is easily perceived, and this problem is so particularly serious. To reduce noise, the heat pump may externally and internally include a sound shielding mechanism, for example. This may adversely affect the above-stated advantages of a heat pump of decreasing the size of the device and improving the energy efficiency. In this way, there are still problems to be solved to realize a cool air/warm air generation system for cooling and heating electric vehicles which suppress noise while achieving a compact size of the system as a whole and high energy-efficiency.

In view of the above situations, the present invention aims to provide a cool air/warm air generation system for cooling and heating electric vehicles which suppress noise while achieving a compact size of the system as a whole and high energy-efficiency.

Means for Solving the Problem

To solve the above problems, the present invention provides the following cool air/warm air generation system to cool and warm the air in an electric vehicle.

[1] A cool air/warm air generation system to cool and heat a cabin of an electric vehicle, including: an acoustic wave generation unit that includes a linear motor which receives AC power and generates a vibration force in a linear direction, the acoustic wave generation unit oscillating working fluid, that has a pressure of 35 atm or less and oscillates to transmit acoustic waves, with the linear motor so as to generate acoustic waves with a frequency in a range from 50 Hz or more and 500 Hz or less and in accordance with the frequency of the AC power; a transmission tube that is filled with the working fluid, and transmits acoustic waves generated at the acoustic wave generation unit with oscillations of the working fluid; and a cool air/warm air generation unit that obtains first external air and second external air from an outside of the electric vehicle and gives heat of the first external air to the second external air via acoustic waves transmitted through the transmission tube so as to change the first external air into cool air with a decreased temperature and change the second external air into warm air with an increased temperature, wherein the cool air/warm air generation unit includes: a heat/acoustic wave conversion component that has a partition wall which defines a plurality of cells extending between two end faces of the heat/acoustic wave conversion component and having inside thereof being filled with the working fluid, the heat/acoustic wave conversion component mutually converting heat exchanged between the partition wall and the working fluid and energy of acoustic waves resulting from oscillations of the working fluid; a heat exchanger for cool air that is disposed close to one of the two end faces of the heat/acoustic wave conversion component and that receives heat from the first external air flowing into the heat exchanger for cool air and gives the heat to the one end face of the heat/acoustic wave conversion component so as to flow out the cold air; and a heat exchanger for warm air that is disposed close to the other end face of the heat/acoustic wave conversion component and that receives heat from the other end face and gives the heat to the second external air flowing into the heat exchanger for warm air so as to flow out the warm air, wherein the heat/acoustic wave conversion component has a cell density of 620 cells/cm$^2$ or more and 3100 cells/cm$^2$ or less of a cell-structured region occupied by a cross section of the partition wall and a cross section of the cells in a cross section perpendicular to the extending direction of the cells, and a material of the partition wall has heat conductivity of 5.0 W/mK or less.

[2] The cool air/warm air generation system according to [1], wherein the heat/acoustic wave conversion component includes a circumferential wall that connects circumferential parts of the two end faces so as to surround the partition wall as a whole and so defines a lateral part of the heat/acoustic wave conversion component, and a ratio of an equivalent circle diameter of the cell-structured region to an equivalent circle diameter of the cross section of the heat/acoustic wave conversion component is 0.6 or more and 0.94 or less.

[3] The cool air/warm air generation system according to [2], wherein the ratio is 0.8 or more and 0.9 or less.

[4] The cool air/warm air generation system according to [2] or [3], wherein the circumferential wall is monolithic with the partition wall.

[5] The cool air/warm air generation system according to any one of [1] to [4], wherein a cell structure body, that is a portion of the whole of the heat/acoustic wave conversion component in which a cell structure is formed by the partition wall and the cells, has a Young's modulus of 7 GPa or more.

[6] The cool air/warm air generation system according to any one of [1] to [5], wherein the acoustic wave generation unit includes a sealing oscillation member that has a hole section which forms a through hole, and that seals the transmission tube other than the hole section and receives a vibration force generated by the linear motor to oscillate in the linear direction, wherein the hole section forms, as the through hole, a through hole whose size enables the hole section to exert a frequency-filtering function such that; when the sealing oscillation member oscillates with a high frequency higher than 500 Hz or with a low frequency lower than 50 Hz, the hole section allows the working fluid to enter the hole section or to pass through the hole section so as to suppress oscillations of the working fluid with the high frequency or the low frequency, and when the sealing oscillation member oscillates with a frequency in a range of 50 Hz or more and 500 Hz or less, the hole section allows oscillation of the working fluid at the frequency in the range.

[7] The cool air/warm air generation system according to any one of [1] to [6], wherein the acoustic wave generation unit selectively executes; a heating mode in which the acoustic wave generation unit generates acoustic waves traveling from the one end face to the other end face of the heat/acoustic wave conversion component through the cells of the heat/acoustic wave conversion component, and a cooling mode in which the acoustic wave generation unit generates acoustic waves traveling from the other end face to the one end face of the heat/acoustic wave conversion component through the cells of the heat/acoustic wave conversion component, and the cool air/warm air generation unit selectively executes; a driving mode in which the cool air/warm air generation unit obtains the first external air from the outside of the electric vehicle and obtains first cabin air instead of the second external air, and a ventilation mode in which the cool air/warm air generation unit obtains the second external air from the outside of the electric vehicle and obtains second cabin air instead of the first external air, wherein when the acoustic wave generation unit executes the heating mode and the cool air/warm air generation unit executes the driving mode, the heat exchanger for cool air receives heat from the first external air and gives the heat to the one end face, and flows out air that corresponds to the first external air after giving the heat to the heat exchanger for cool air to the outside of the electric vehicle, and the heat exchanger for warm air receives the heat of the first external air from the other end face via acoustic waves and gives the heat to the first cabin air, and flows out air that corresponds to the first cabin air after receiving the heat into the cabin of the electric vehicle, when the acoustic wave generation unit executes the heating mode and the cool air/warm air generation unit executes the ventilation mode, the heat exchanger for cool air receives heat from the second cabin air and gives the heat to the one end face, and flows out air that corresponds to the second cabin air after giving the heat to the heat exchanger for cool air to the outside of the electric vehicle, and the heat exchanger for warm air receives the heat of the second cabin air from the other end face via acoustic waves and gives the heat to the second external air, and flows out air that corresponds to the second external air after receiving the heat into the cabin of the electric vehicle, when the acoustic wave generation unit executes the cooling mode and the cool air/warm air generation unit executes the driving mode, the heat exchanger for warm air receives heat from the first cabin air and gives the heat to the other end face, and flows out air that corresponds to the first cabin air after giving the heat to the heat exchanger for warm air into the cabin of the electric vehicle, and the heat exchanger for cool air receives the heat of the first cabin air from the one end face via acoustic waves and gives the heat to the first external air, and flows out air that corresponds to the first external air after receiving the heat to the outside of the electric vehicle, and when the acoustic wave generation unit executes the cooling mode and the cool air/warm air generation unit executes the ventilation mode, the heat exchanger for warm air receives heat from the second external air and gives the heat to the other end face, and flows out air that corresponds to the second external air after giving the heat to the heat exchanger for warm air into the cabin of the electric vehicle, and the heat exchanger for cool air receives the heat of the second external air from the one end face via acoustic waves and gives the heat to the second cabin air, and flows out air that corresponds to the second cabin air after receiving the heat to the outside of the electric vehicle.

Effect of the Invention

The cool air/warm air generation system of the present invention includes the heat/acoustic wave conversion component having a high cell density of 620 cells/cm$^2$ to 3100 cells/cm$^2$, and so achieves high energy efficiency while being compact in size. The heat/acoustic wave conversion component includes a partition wall and an outer wall made of a material having heat conductivity of 5.0 W/mK or less, and so enables sufficient heat exchange between the working fluid in the cells and the partition wall and achieves high energy efficiency. Acoustic waves, which implement a thermoacoustic effect of drawing heat from external air to generate warm air and cool air, have the frequency of 50 Hz or more, and so keeps the minimum necessary energy efficiency. These acoustic waves have a frequency of 500 Hz or less, which makes it possible to avoid noise due to the acoustic waves that may be annoyance and unpleasant to the passenger's ear in the electric vehicle including the cool air/warm air generation system of the present invention.

MODE FOR CARRYING OUT THE INVENTION

The following describes embodiments of the present invention, with reference to the drawings. The present invention is not limited to the following embodiments, and is to be understood to include the following embodiments, to which modifications and improvements are added as needed based on the ordinary knowledge of a person skilled in the art without departing from the scope of the present invention.

Figure 1:
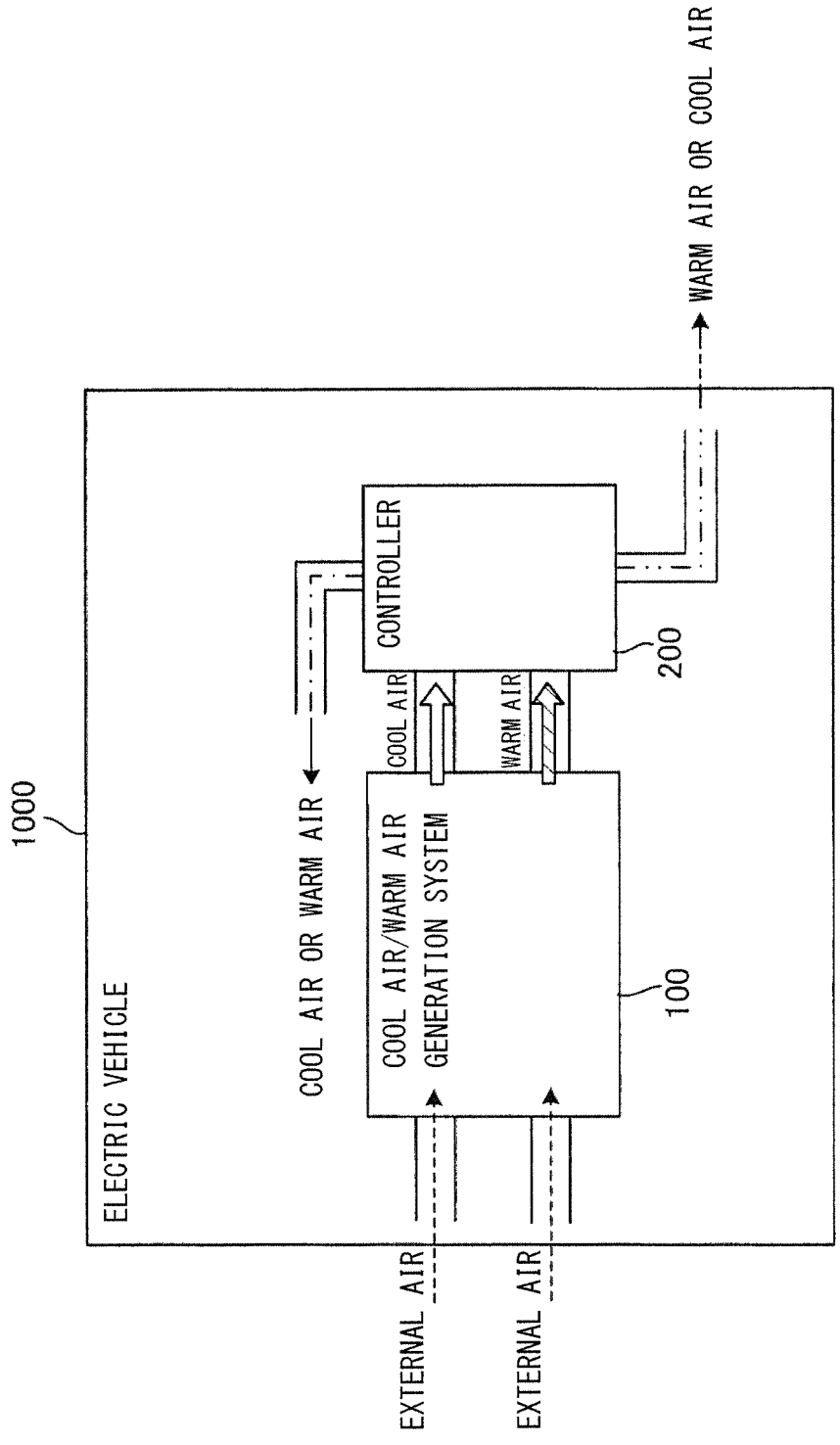
FIG. 1 is a schematic conceptual view showing the configuration of a cooling/heating system for electric vehicle to which one embodiment of a cool air/warm air generation system of the present invention is applied.

FIG. 1 is a schematic conceptual view showing the configuration of a cooling/heating system for electric vehicle 1000 to which one embodiment of a cool air/warm air generation system of the present invention is applied.

The cooling/heating system for electric vehicle 1000 shown FIG. 1 is a system which cools and warms the cabin in the electric vehicle 1000. The cooling/heating system includes a cool air/warm air generation system 100 and a controller 200.

The cool air/warm air generation system 100 obtains external air via two through channels as indicated with two dashed arrows of FIG. 1, generates cool air and warm air from the external air, and sends the cool air and the warm air to the controller 200 as indicated with the hollow thick arrow and the hatched thick arrow in FIG. 1. The "external air" refers to the air outside of the electric vehicle 1000. The "cool air" refers to the external air with a decreased temperature because the heat of the external air is absorbed, and the "warm air" refers to the external air with an increased temperature because the external air absorbs heat. The cooling/heating system for electric vehicle 1000 may include a not-illustrated external-air blowing unit which sucks the air outside of the electric vehicle 1000 and sends the air to the cool air/warm air generation system 100 so that the cool air/warm air generation system 100 can take in the external air efficiently. A specific example of the external-air blowing unit includes a ventilation fan.

In accordance with the manipulation by the user's (driver or passenger) in the electric vehicle 1000 of the cooling/heating system for setting, the controller 200 releases one of the cool air and the warm air from the cool air/warm air generation system 100 into the cabin of the electric vehicle 1000 (see the dash-dot arrow in the drawing) and releases the other to the outside of the electric vehicle 1000 (see the dash-dot-dot arrow in the drawing). In one example, when the user sets heating, the controller 200 releases warm air into the cabin of the electric vehicle 1000 and releases cool air to the outside of the electric vehicle 1000. As a result, the cabin of the electric vehicle 1000 is heated. When the user sets cooling, the controller 200 releases cool air into the cabin of the electric vehicle 1000 and releases warm air to the outside of the electric vehicle 1000. As a result, the cabin of the electric vehicle 1000 is cooled.

The following describes the configuration of the cool air/warm air generation system 100.

Figure 2:
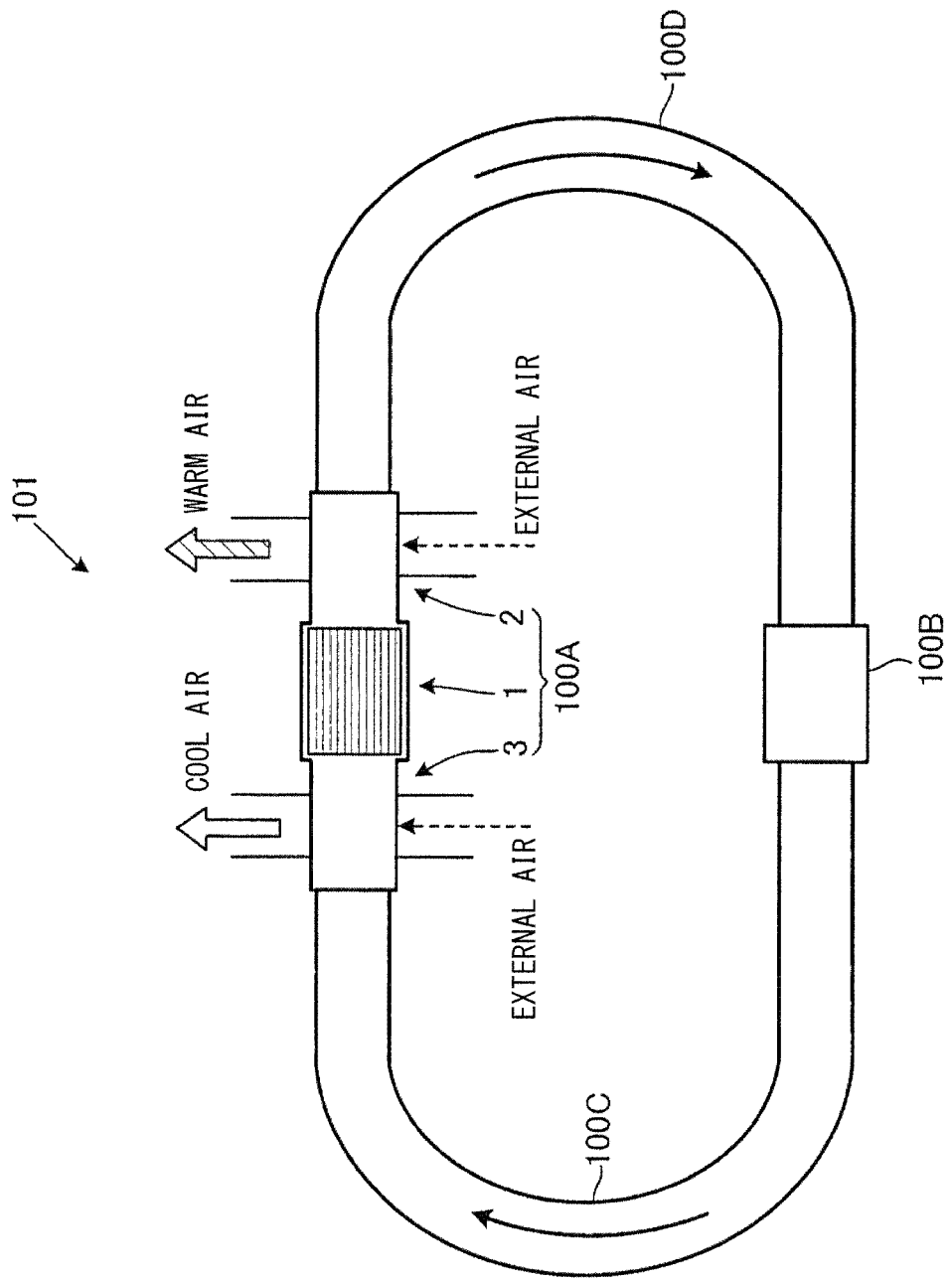
FIG. 2 shows the configuration of a cool air/warm air generation system that is one example of the cool air/warm air generation system of FIG. 1.

FIG. 2 shows the configuration of a cool air/warm air generation system 101 that is one example of the cool air/warm air generation system 100 of FIG. 1.

The cool air/warm air generation system 101 of FIG. 2 includes a cool air/warm air generation unit 100A, an acoustic wave generation unit 100B, and a first transmission tube 100C.

The acoustic wave generation unit 100B receives AC power from an AC power supplying unit not illustrated to oscillate working fluid in the acoustic wave generation unit 100B with a mechanism described later so as to generate acoustic waves with the frequency in accordance with the frequency of the AC power within a range of 50 Hz or more and 500 Hz or less as described later. In this way, the acoustic wave generation unit 100B generates acoustic waves with a frequency that is adjustable in accordance with the frequency of the AC power supplied to the acoustic wave generation unit 100B. Basically a higher frequency of the acoustic waves leads to a larger thermoacoustic effect, and accordingly transfers a larger amount of heat (drawing amount of heat). Basically a larger cool air/warm air generation system yields a larger thermoacoustic effect, and accordingly transfers a larger amount of heat (drawing amount of heat). From the viewpoints of not increasing the size of the cool air/warm air generation system 101 and transferring a sufficient amount of heat (drawing amount of heat) for cooling and heating the electric vehicle, the acoustic wave generation unit 100b is required to generate acoustic waves with a frequency of 50 Hz or more. In the range of the frequency of 50 Hz or more, the frequency of 100 Hz or more is preferable.

Note here that a higher frequency means larger noise of acoustic waves that is transmitted to the outside of the cool air/warm air generation system 101. Electric vehicles especially have engine sound smaller than in a vehicle burning fossil fuels. Such noise therefore is easily perceived in electric vehicles, and this problem is serious. From the viewpoint of suppressing the noise that may be annoyance and unpleasant to the passenger's ear in the electric vehicle 1000 of FIG. 1, the acoustic waves has to have a frequency of 500 Hz or less. The frequency of 200 Hz or less is preferable.

That is, a frequency of 50 Hz or more and 500 Hz or less is required. Particularly a frequency of 100 Hz or more and 200 Hz or less is preferable.

The acoustic wave generation unit 100B connects to one end of the first transmission tube 100C. The inside of the first transmission tube 100C is filled with the working fluid of the same type as the working fluid in the acoustic wave generation unit 100B. Oscillations of the working fluid in the acoustic wave generation unit 100B is transmitted to the working fluid in this first transmission tube 100C, so that the acoustic waves generated in the acoustic wave generation unit 100B is transmitted through the first transmission tube 100C in the direction of the arrow in the first transmission tube 100C.

The cool air/warm air generation unit 100A connects to the other end (the end of the first transmission tube 100C on the other side of the one end) of the first transmission tube 100C. The acoustic waves transmitted through the first transmission tube 100C pass through the cool air/warm air generation unit 100A. The cool air/warm air generation unit 100A includes a heat/acoustic wave conversion component 1, a heat exchanger for warm air 2, and a heat exchanger for cool air 3.

The heat/acoustic wave conversion component 1 is a honeycomb structure having a plurality of cells (described later in details referring to FIG. 3 and FIG. 4) extending between two end faces of the heat/acoustic wave conversion component 1. These cells are through holes like thin tubes penetrating through the two end faces. The inside of these cells is filled with the working fluid as stated above, and the cells communicate with the first transmission tube 100C via the heat exchanger for cool air 3. Acoustic waves transmitted through the first transmission tube 100C travel through these cells. During travelling, the thermoacoustic effect of these acoustic waves transfers heat from the upstream end face to the downstream end face of the heat/acoustic wave conversion component 1 in the acoustic-wave travelling direction.

The following briefly describes the thermoacoustic effect. A temperature difference given to thin tubes at both ends forms a temperature gradient at the thin tubes in their extending directions. Then the fluid (typically gas) inside of the thin tubes on the high-temperature side absorbs heat from the inner wall surface of the tubes and so expands from the high-temperature side to the low-temperature side. Then, the fluid releases heat to the inner wall surface on the low-temperature side and is compressed, and then returns back to the high-temperature side. Such exchange of heat between the fluid and the inner wall surface of the thin tubes and expansion/compression of the fluid are repeated, which results in oscillations (self-induced oscillations) of the fluid in the extending direction of the thin tubes. A converse phenomenon of the self-induced oscillations also occurs so that transmission of acoustic waves through thin tubes forms a temperature gradient at both ends of the thin tubes. Simply speaking this converse phenomenon allows acoustic waves to transfer heat from one end to the other end of thin tubes while travelling through the thin tubes. These phenomena of generating acoustic waves due to a temperature gradient and of generating a temperature gradient due to acoustic waves conversely are called thermoacoustic effects. Particularly heat transferring in the heat/acoustic wave conversion component 1 as stated above is based on the latter thermoacoustic effect of generating a temperature gradient due to acoustic waves.

Referring back to FIG. 2, the following describes the cool air/warm air generation unit 100A again.

The cool air/warm air generation unit 100A includes two heat exchangers including the heat exchanger for warm air 2 and the heat exchanger for cool air 3 having the heat/acoustic wave conversion component 1 between these heat exchangers. The other end of the first transmission tube 100C as stated above connects to the heat exchanger for cool air 3. The heat exchanger for cool air 3 is disposed close to the upstream end face of the heat/acoustic wave conversion component 1 in the acoustic-wave travelling direction. The heat exchanger for cool air 3 receives heat from the external air flowing into the heat exchanger for cool air 3 (see the dotted arrow toward the heat exchanger for cool air 3) and gives the heat to the upstream end face of the heat/acoustic wave conversion component 1 in the acoustic-wave travelling direction. Then the heat exchanger for cool air 3 discharges cool air (see the hollow thick arrow) that corresponds to the external air after giving the heat to the heat exchanger for cool air 3 and has a temperature lower than the external air. The heat exchanger for warm air 2 is disposed close to the downstream end face of the heat/acoustic wave conversion component 1 in the acoustic-wave travelling direction. The heat exchanger for warm air 2 receives heat from the downstream end face in the acoustic-wave travelling direction and gives the heat to the external air flowing into the heat exchanger for warm air 2 (see the dotted arrow toward the heat exchanger for warm air 2). Then the heat exchanger for warm air 2 discharges warm air (see the hatched thick arrow) that corresponds to the external air after receiving the heat from the heat exchanger for warm air 2 and has a temperature higher than the external air.

In other words, the cool air/warm air generation unit 100A includes the heat/acoustic wave conversion component 1 functioning as stated above, and so functions as a heat pump that receives heat from the external air flowing into the heat exchanger for cool air 3 and gives the heat to the external air flowing into the heat exchanger for warm air 2.

As stated above, the first transmission tube 100C connects to both of the acoustic wave generation unit 100B and the heat exchanger for cool air 3 in the cool air/warm air generation unit 100A, and functions to transmit the acoustic waves generated at the acoustic wave generation unit 100B to the cool air/warm air generation unit 100A. This first transmission tube 100C corresponds to one example of a transmission tube of the present invention.

The cool air/warm air generation system 101 of FIG. 2 includes a second transmission tube 100D in addition to this first transmission tube 100C. The second transmission tube 100D connects to both of the heat exchanger for warm air 2 in the cool air/warm air generation unit 100A and the acoustic wave generation unit 100B. This second transmission tube 100D also is filled with the working fluid, and the second transmission tube 100D functions to return the acoustic waves passing through the cool air/warm air generation unit 100A to the acoustic wave generation unit 100B. The cool air/warm air generation system 101 of FIG. 2, which includes this second transmission tube 100D in addition to the first transmission tube 100C, the acoustic wave generation unit 100B and the cool air/warm air generation unit 100A as stated above, defines a loop-like transmission path of the acoustic waves as a whole. The working fluid is confined in this loop-like transmission path of the acoustic waves, and has a function to transmit acoustic waves. The acoustic waves mainly travel through this loop-like transmission path counterclockwise as indicated with the arrows in FIG. 2. The first transmission tube 100C and the second transmission tube 100D may have different diameters.

The working fluid confined in this loop-like transmission path has a pressure of 35 atm or less. If the pressure is 35 atm or more, noise due to acoustic waves may be annoyance and unpleasant to the passenger's ear in the electric vehicle 1000 of FIG. 1. Examples of the working fluid include gas having low viscosity and being less reactive, such as rare gas.

Although the following description is based on this loop-like transmission path of acoustic waves, the present invention may include the first transmission tube 100C to transmit the acoustic waves generated at the acoustic wave generation unit 100B to the cool air/warm air generation unit 100A as the minimum requirement. That is, the present invention may have various forms of the transmission path of acoustic waves other than the loop-like form shown in FIG. 2 that meet the minimum requirement as stated above and are well-known in the field of thermoacoustic effects. These various forms are described later.

The following describes one specific example of the configuration of the cool air/warm air generation unit 100A of FIG. 2.

Figure 3:
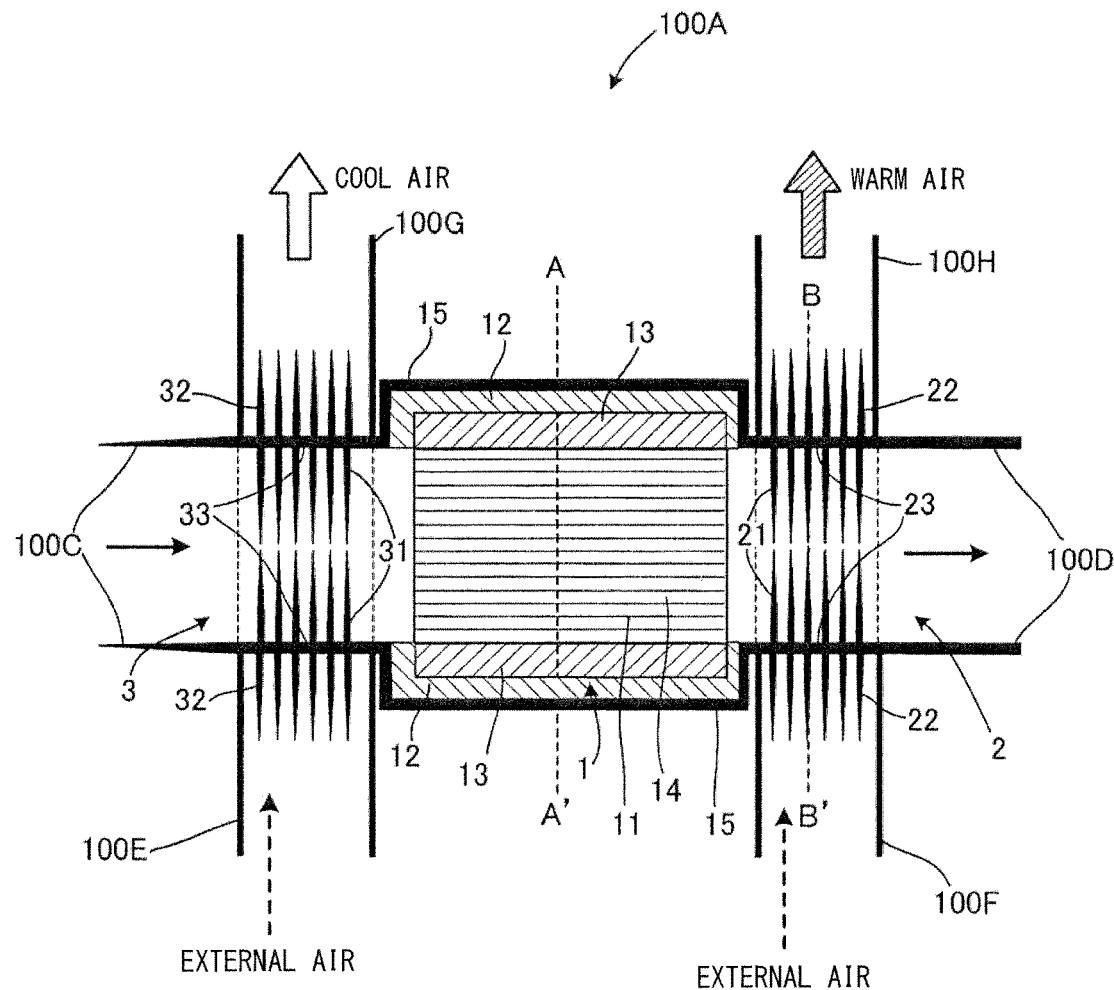
FIG. 3 is a schematic view showing one specific example of the configuration of the cool air/warm air generation unit of FIG. 2.

FIG. 3 is a schematic view showing one specific example of the configuration of the cool air/warm air generation unit 100A of FIG. 2.

The following describes one specific example of the configuration of the cool air/warm air generation unit 100A of FIG. 2, referring to FIG. 3, and like reference numerals indicate like parts in FIG. 2. Particularly to show the correspondences between these drawings, the same reference numeral 100A as the cool air/warm air generation unit 100A of FIG. 2 is assigned to the cool air/warm air generation unit of FIG. 3 as well that is one specific example.

As described above referring to FIG. 2, the cool air/warm air generation unit 100A of FIG. 3 includes the heat/acoustic wave conversion component 1, the heat exchanger for warm air 2 and the heat exchanger for cool air 3, and additionally includes a buffer 12 and a housing 15.

The heat/acoustic wave conversion component 1 of FIG. 3 includes a partition wall 11 that defines a plurality of cells 14 extending between two end faces of the heat/acoustic wave conversion component 1. Each of the plurality of cells 14 is a thin tube-like through hole. The term "cell" in the description refers to a through-hole only that does not include the partition wall. Each cell 14 has a penetrating direction (extending direction of each cell 14) that is the horizontal direction (left-right direction) of FIG. 3, and is open at both end faces opposed to the heat exchanger for cool air 3 and the heat exchanger for warm air 2. The heat/acoustic wave conversion component 1 of FIG. 3 also includes a circumferential wall 13 that connects the circumferential parts of these two end faces so as to surround the partition wall 11 as a whole and so defines the lateral part of the heat/acoustic wave conversion component 1.

The housing 15 accommodates the heat/acoustic wave conversion component 1 and the buffer 12 as a whole. The buffer 12 wraps around the lateral face of the heat/acoustic wave conversion component 1, and is disposed between the housing 15 and the heat/acoustic wave conversion component 1 while being in pressure-contact with the circumferential wall 13 of the heat/acoustic wave conversion component 1. The buffer 12 absorbs influences from external impact to the heat/acoustic wave conversion component 1 or the oscillations due to acoustic waves, and also keeps the position of the heat/acoustic wave conversion component 1 in the housing 15.

Figure 4:
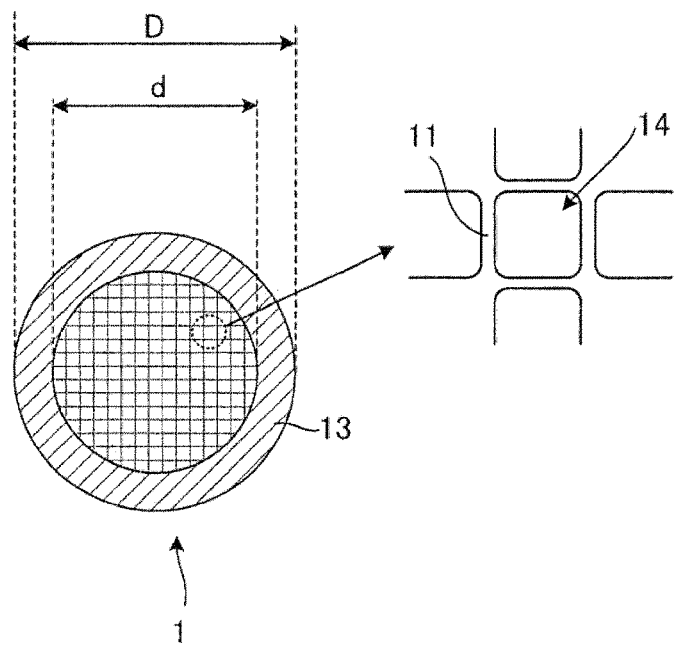
FIG. 4 is a cross-sectional view of the heat/acoustic wave conversion component taken along the line A-A' of FIG. 3.

FIG. 4 is a cross-sectional view of the heat/acoustic wave conversion component 1 taken along the line A-A' of FIG. 3.

As shown in FIG. 4, the heat/acoustic wave conversion component 1 includes the plurality of cells 14 that is defined by the partition wall 11, and also includes the circumferential wall 13 that surrounds the partition wall 11 as a whole. The circumferential wall 13 may be made of the same material as that of the partition wall 11.

As is understood from the above descriptions on the thermoacoustic effect, in order to obtain larger thermoacoustic effect and higher energy efficiency, it is advantageous that the heat/acoustic wave conversion component includes a large number of cells each having a smaller opening area, i.e., it is advantageous that the heat/acoustic wave conversion component has a higher cell density. The heat/acoustic wave conversion component 1 of FIG. 4 has a high cell density of 620 cells/cm$^2$ (4000 cells per square inch (cpsi)) or more in the region occupied by the cross section of the partition wall 11 and the cross section of the cells 14 in a cross section of the heat/acoustic wave conversion component 1 perpendicular to the extending direction of the cells 14. (Note: The following simply refers to this region as a cell-structured region. This cell-structure region does not include the cross section of the circumferential wall.) As a result, the heat/acoustic wave conversion component 1 easily achieves high energy efficiency even if the heat/acoustic wave conversion component 1 is compact. Conversely, if the cell density is less than 620 cells/cm$^2$, then the number of cells per unit area contributing to the thermoacoustic effect is too small, and so a very large thermoacoustic effect will not be achieved.

Too high cell density, however, means a very small hydraulic diameter of the cell openings at the end faces of the heat/acoustic wave conversion component. The working fluid therefore receives large flow resistance from the end faces of the heat/acoustic wave conversion component. In this case, acoustic-wave energy tends to be consumed more for the oscillations of the heat/acoustic wave conversion component and not for the thermoacoustic effect. This may result in problems of generating noise due to oscillations of the heat/acoustic wave conversion component and degrading the energy efficiency. To avoid these problems, the heat/acoustic wave conversion component 1 has cell density of 3100 cells/cm$^2$ (20000 cpsi) or less. Conversely if cell density is more than 3100 cells/cm$^2$, the working fluid receives large flow resistance from the end faces of the heat/acoustic wave conversion component, and so the level of noise generated due to oscillations of the heat/acoustic wave conversion component 1 and of degradation of energy efficiency becomes too large to ignore.

In this way, the heat/acoustic wave conversion component 1 may have cell density in the cell-structured region of 620 cells/cm$^2$ or more and 3100 cells/cm$^2$ or less. This keeps a good balance among the compact size of the heat/acoustic wave conversion component 1, high energy efficiency and suppression of noise. For cell density of 620 cells/cm$^2$ or more and 3100 cells/cm$^2$ or less, cell density of 700 cells/cm$^2$ or more and 800 cells/cm$^2$ or less is preferable.

The cell density is obtained as follows. An image of a cross section perpendicular to the extending direction of the cells 14 is taken by a microscope, and the area S of the cell-structured region and the total number N of the cells are obtained from the taken image. Then the cell density is obtained as the value of N/S.

The materials of the partition wall 11 (the materials make up the circumferential wall 13 as well when the circumferential wall 13 is made of the same material as the partition wall 11) of the heat/acoustic wave conversion component 1 has low heat conductivity of 5.0 W/mK or less. If the heat conductivity is larger than 5.0 W/mK, heat is often transmitted through the partition wall 11 before heat is exchanged well between the working fluid in the cells 14 and the partition wall 11, and so a sufficient thermoacoustic effect may not be obtained. Low heat conductivity of 5.0 W/mK or less enables sufficient heat exchange between the working fluid in each cell 14 and the partition wall 11, and so a sufficient thermoacoustic effect can be obtained. One of the methods of achieving the heat conductivity of 5.0 W/mK or less includes selecting cordierite as a material of the partition wall 11 (cordierite makes up the circumferential wall 13 as well when the circumferential wall 13 and the partition wall 11 are made of the same material). For heat conductivity of 5.0 W/mK or less, heat conductivity of 1.5 W/mK or less is preferable. Too small heat conductivity, however, may transfer heat to a part of the partition wall 11 and fail to transfer heat to the other part of the partition wall 11. This interferes with a thermoacoustic effect. Heat conductivity therefore is preferably at least 0.01 W/mK or more.

Heat conductivity can be obtained by a temperature gradient method (steady method). Specifically, the heat conductivity is obtained as follows. Firstly, a plate-shaped test sample is cut out from a target for the heat conductivity measurement, and this plate-shaped test sample is sandwiched between spacers whose heat conductivity is known (e.g., made of metals, such as copper and stainless steel). Then, the one side is heated to 30° C. to 200° C., and the other side is cooled to 20 to 25° C. In this way, a certain temperature difference is given in the thickness direction of the test sample. Then, the amount of heat flow transmitted in the test sample is obtained based on the temperature gradient in the spacers, and this amount of heat flow is divided by the temperature difference to calculate the heat conductivity.

Preferably the circumferential wall 13 accounts for a sufficiently large portion of the heat/acoustic wave conversion component 1 as a whole. Specifically let that D denotes the equivalent circle diameter of a cross section of the heat/acoustic wave conversion component 1 perpendicular to the extending direction of the cells 14 and d denotes the equivalent circle diameter of the region occupied by the cross section of the partition wall 11 and the cross section of the cells 14, i.e., the cell-structured region in this cross section of the heat/acoustic wave conversion component 1, then the ratio d/D is preferably 0.94 or less. The equivalent circle diameter refers to the length defined as $2\times(S/\pi)^{1/2}$, where S denotes the area of a region as a target to obtain the equivalent circle diameter. FIG. 4 shows an example where the heat/acoustic wave conversion component 1 has a round cross section, and the cell-structured region also is round. In this case, the equivalent circle diameter D of the heat/acoustic wave conversion component 1 in cross section is a diameter of the circle in this cross section, and the equivalent circle diameter d of the cell-structured region is a diameter of the circle of this cell-structured region.

Roughly speaking the ratio d/D of 0.94 or less means that the circumferential wall 13 is quite thick as compared with a circumferential wall of conventional honeycomb structures. In practice a honeycomb structure available as a filter to purify exhaust gas from automobiles, for example, may include a circumferential wall that has a sufficient thickness to protect a part including the partition wall and cells from the outside. To avoid an increase in size of the exhaust-gas purifying device, the ratio d/D of such a honeycomb structure is typically 0.96 or more. Especially recently developed honeycomb structures have improved durability of the partition walls, and so have thinner circumferential walls. No circumferential wall is required in some cases. The same applies to a honeycomb structure for heat/acoustic wave conversion in a conventional heat pump based on the thermoacoustic effect.

The heat/acoustic wave conversion component 1 has the ratio d/D of 0.94 or less, which sufficiently suppresses oscillations of a portion of the whole of the heat/acoustic wave conversion component 1 in which a cell structure is formed by the partition wall 11 and the cells 14 (hereinafter this part is simply called a cell structure body) due to the circumferential wall 13 when acoustic waves pass through the cell structure body. As a result this suppresses noise resulting from oscillations of the heat/acoustic wave conversion component 1 and the surroundings. This also avoids damage of the cell structure due to oscillations of the cell structure. The acoustic-wave energy then is consumed solely for the thermoacoustic effect (to form a temperature gradient) and not for oscillations of the heat/acoustic wave conversion component 1, and so the energy efficiency also improves. Conversely if the ratio d/D is larger than 0.94, the acoustic-wave energy is not consumed well for the thermoacoustic effect, but is consumed for oscillations of the heat/acoustic wave conversion component 1 and the surroundings. This case therefore does not achieve high energy efficiency and a good effect of suppressing noise.

A too small ratio d/D, however, means that the circumferential wall 13 occupies a too large portion of the heat/ acoustic wave conversion component 1. This case does not achieve a sufficient thermoacoustic effect in accordance with the size of the heat/acoustic wave conversion component 1, and the heat transfer amount per unit volume (corresponding to the heating energy of external air) of the heat/acoustic wave conversion component 1 decreases. That is, a larger heat/acoustic wave conversion component 1 is required for a sufficient thermoacoustic effect, which is against the demand to make a cool air/warm air generation system compact. This also causes heat to transfer to the circumferential wall 13 easily (heat easily stays in the circumferential wall 13), and so the energy efficiency decreases. To avoid these problems, the heat/acoustic wave conversion component 1 has the ratio d/D of 0.6 or more. If the ratio d/D is less than 0.6, the heat transfer amount per unit volume of the heat/acoustic wave conversion component 1 is too small. Then the heat/acoustic wave conversion component 1 has to increase in size. This interferes with high energy efficiency as well.

In this way, from the viewpoints of improving the energy efficiency, suppressing an increase in size of the heat/acoustic wave conversion component 1, and suppressing noise, the ratio d/D of the heat/acoustic wave conversion component 1 is preferably 0.6 or more and 0.94 or less. In the numerical range of the ratio d/D of 0.6 or more and 0.94 or less, the numerical range of 0.8 or more and 0.9 or less is preferable.

Preferably in order to bond the partition wall 11 and the circumferential wall 13 strongly and achieve a good effect from the numerical range of the ratio d/D as stated above, the heat/acoustic wave conversion component 1 includes the partition wall 11 and the circumferential wall 13 that are monolithically formed. "Monolithic forming" means that the partition wall and the circumferential wall made of the same material are formed at one time by extrusion. Preferably the entire partition wall 11 and the entire circumferential wall 13 are formed monolithically because they bond particularly strongly in this case. FIG. 3 and FIG. 4 show one specific example of the entire partition wall 11 and the entire circumferential wall 13 that are formed monolithically. The present invention may include a segmented-structured heat/acoustic wave conversion component that is prepared by manufacturing a plurality of segments each including a part of the partition wall 11 and a part of the circumferential wall 13 that are formed monolithically and bonding these segments.

Figure 5:
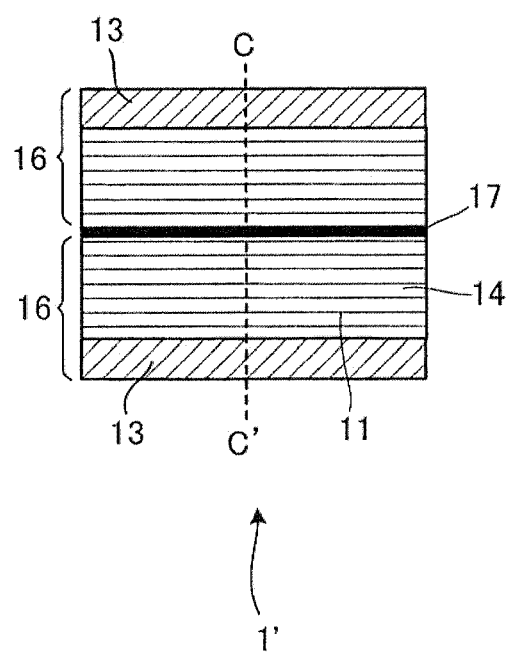
FIG. 5 shows the configuration of a segmented-structured heat/acoustic wave conversion component.
Figure 6:
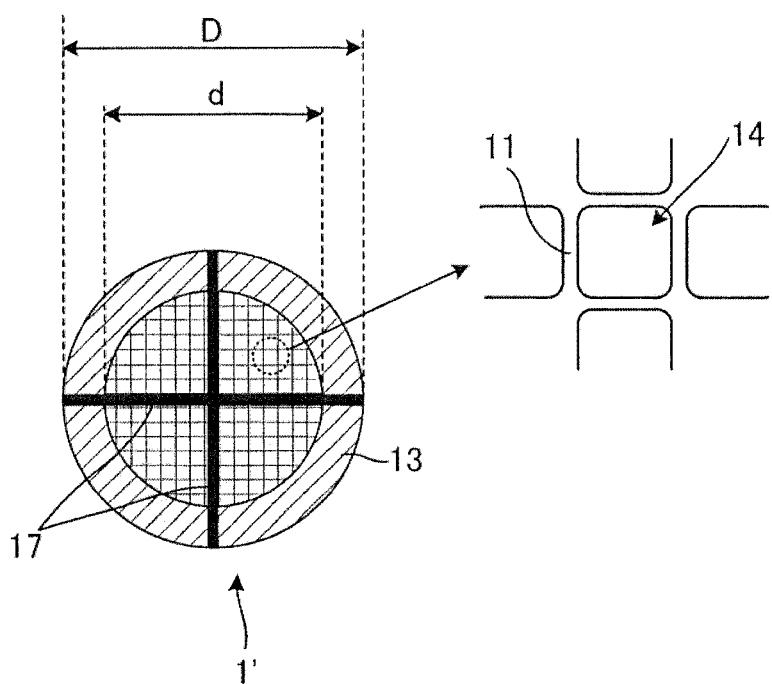
FIG. 6 is a cross-sectional view of the heat/acoustic wave conversion component taken along the line C-C' of FIG. 5.

FIG. 5 shows the configuration of a segmented-structured heat/acoustic wave conversion component 1', and FIG. 6 is a cross-sectional view of the heat/acoustic wave conversion component 1' taken along the line C-C' of FIG. 5.

In FIG. 5 and FIG. 6, like numerals indicate like parts in FIG. 3 and FIG. 4, and their descriptions are omitted. As shown in FIG. 5 and FIG. 6, the segmented-structured heat/acoustic wave conversion component 1' has a portion of the whole of the heat/acoustic wave conversion component 1 (a cell structure body) in which a cell structure is formed by the partition wall 11 and the cells 14 and the circumferential wall 13 that are divided into a plurality of parts (hereinafter called segments 16). Each segment 16 is manufactured by forming a part making up a part of the cell structure of the heat/acoustic wave conversion component 1' and a part of the circumferential wall 13 of the heat/acoustic wave conversion component 1' monolithically. These plurality of segments 16 are bonded mutually via a bonding part 17. This heat/acoustic wave conversion component 1' includes the bonding part 17, and so has an advantage of improving the durability against external impact. The bonding part 17 on the other hand may be disadvantageous from the viewpoint of improving energy efficiency, because the number of the cells 14 decreases relative to the heat/acoustic wave conversion component 1 in FIG. 3 and FIG. 4 without such a bonding part 17, and this interferes with the flowability of the working fluid. Let that D denotes the equivalent circle diameter of a cross section of the segmented-structured heat/acoustic wave conversion component 1' perpendicular to the extending direction of the cells 14 and d denotes the equivalent circle diameter of the region occupied by the cross section of the partition wall 11 and the cross section of the cells 14, i.e., the cell-structured region in this cross section (see FIG. 6, for example), then the ratio d/D is preferably 0.6 or more and 0.94 or less, and is 0.8 or more and 0.9 or less more preferably. Although the cell-structured region has a plurality of segments, the sum of the areas of these plurality of segments may be the area S in the definition of the equivalent circle diameter as stated above. Then the equivalent circle diameter d in this case may be obtained. These numerical ranges are the same as those described above for the heat/acoustic wave conversion component 1 of FIG. 3 and FIG. 4. The significance of these numerical ranges also is as described above for the heat/acoustic wave conversion component 1 of FIG. 3 and FIG. 4, Actually the cross-sectional area of the bonding part 17 is small enough compared to the area of the cell-structured region and the area of the circumferential wall 13. Such a bonding part 17, if any, does not interfere with the advantageous effect from the same numerical ranges as those described for the heat/acoustic wave conversion component 1 of FIG. 3 and FIG. 4.

Referring back to FIG. 3 and FIG. 4, the following describes the heat/acoustic wave conversion component 1 of FIG. 3 and FIG. 4.

The heat/acoustic wave conversion component 1 is exposed to acoustic waves with a high frequency that are generated at the above-described acoustic wave generation unit 100B of FIG. 2. The heat/acoustic wave conversion component 1 therefore has desirably high durability against oscillations of the acoustic waves. To this end, the cell structure of the heat/acoustic wave conversion component 1 preferably has the Young's modulus of 7 GPa or more. The heat/acoustic wave conversion component 1 having such high Young's modulus is flexibly deformable with the oscillations of acoustic waves. Such flexible stretchability reduces the oscillations, and so the heat/acoustic wave conversion component improves in durability against acoustic-wave oscillations. More preferably the Young's modulus of the cell structure is 11 GPa or more to have particularly high durability against acoustic waves.

The upper limit of the Young's modulus is not limited especially, and preferably the Young's modulus is 28 GPa or less. Typically a cell structure of the honeycomb structure having the Young's modulus of 28 GPa or more corresponds to the partition wall material itself being very dense and the density of the partition-wall material being very high. Typically in a honeycomb structure including a ceramic material and so having a large open frontal area (e.g., having the open frontal area of 70% or more), the cell structure does not have such high Young's modulus.

The Young's modulus is measured and calculated by the bending resonance method complying with JIS R1602. Specifically a test piece having the dimensions of 2 mm×6 mm×50 mm is cut out from the remaining portion of the heat/acoustic wave conversion component 1 except the circumferential wall (a cell structure body) in which a cell structure is formed by the partition wall 11 and the cells 14.

Then the primary resonance frequency of the test piece is measured by the primary resonance frequency measurement method complying with the bending resonance method. Here, 50 mm in the dimensions is the length of the test piece along the extending direction of the cells 14, and 6 mm is the width of the test piece in the direction perpendicular to the extending direction of the cells 14. 2 mm in the dimensions is the thickness of the test piece along the direction perpendicular to both of the extending direction of the cells 14 and the width direction of the test piece. When a test piece is cut out from such a heat/acoustic wave conversion component 1, the width direction and the thickness direction may be changed in the plane perpendicular to the extending direction of the cells 14, but such a change hardly affects the calculation result of the Young's modulus since the heat/acoustic wave conversion component 1 has sufficiently high cell density. After cutting the test piece, the mass M (kg) of the test piece is measured. Then the Young's modulus of the test piece is obtained by the formula of Young's modulus specified by the bending resonance method of JIS R1602 based on the primary resonance frequency, the mass M (kg) of the test piece and the dimensions of the test piece (length, width and thickness). The Young's modulus obtained this way is the Young's modulus of the cell structure.

In the heat/acoustic wave conversion component 1, the cells 14 preferably have a cross-sectional shape that is perpendicular to the extending direction of the cells that is a polygonal shape whose corners are curved, and the corners of the shape preferably have a curvature radius of 0.02 mm or more and 0.1 mm or less. FIG. 4 shows an example of the shape of the cells 14 in the enlarged view on the upper right, where the squares shown have curved corners, and the corners have a curvature radius of 0.02 mm or more and 0.1 mm or less. Such a curvature radius of 0.02 mm or more means a gently curved shape, and so it can sufficiently resist an impact acting to crush the cells 14. This is based on the same reason for the shape of a hole, such as a tunnel, i.e., a rounded shape is more resistant to an external force from the surrounding than an angular shape. If the curved part is too large, then the partition wall 11 close to the corners of the cells is thick, and accordingly the open frontal area decreases, and the thermoacoustic effect obtained can be reduced. Then, the curvature radius is set at 0.1 mm or less, whereby a high thermoacoustic effect also can be kept at the same time.

The curvature radius at the corners of the cells 14 can be obtained by taking an enlarged photo of a cross section of the heat/acoustic wave conversion component 1 perpendicular to the extending direction of the cells 14 and by measuring the curvature radius based on cross-sectional shapes of the cells 14 in the photo.

The cells 14 may have a shape in a plane perpendicular to the extending direction of the cells 14 that are various polygons, such as triangles, quadrangles, pentagons and hexagons as well as ellipses (including a perfect circle shape). Among them, triangles, quadrangles and hexagons and their combinations are preferable, and quadrangular cells as in the upper right enlarged view of the cells 14 of the heat/acoustic wave conversion component 1 of FIG. 4 or triangular cells are particularly preferable. Quadrangles and triangles are particularly preferable because they are suitable among various polygonal shapes and elliptical cell shapes for the arrangement of a lot of cells while minimizing the thickness of the partition wall.

The partition wall 11 and the circumferential wall 13 of the heat/acoustic wave conversion component 1 preferably include, as a main component, one or two or more in combination of cordierite, mullite, aluminum titanate, alumina, silicon nitride, silicon carbide, silicon (metal silicon) and heat resistance resins. Including "as a main component" in the descriptions means that the material accounts for 50 mass % or more of the overall mass.

That is the detailed descriptions on the configuration of the heat/acoustic wave conversion component 1 of FIG. 3 and FIG. 4. Next the following describes the heat exchanger for warm air 2 and the heat exchanger for cool air 3 in FIG. 3.

The heat exchanger for cool air 3 has an inner circumferential tube for cool air 33. This inner circumferential tube for cool air 33 has one end connecting to the first transmission tube 100C, and has the other end connecting to the housing 15 of the heat/acoustic wave conversion component 1. The inner circumferential tube for cool air 33 communicates with each of the cells 14 of the heat/acoustic wave conversion component 1 and the first transmission tube 100C, and is filled with the working fluid. After travelling through the first transmission tube 100C in the direction indicated with the solid arrow in the first transmission tube 100C, the acoustic waves pass through the inner circumferential tube for cool air 33 to go into the cells 14 of the heat/acoustic wave conversion component 1. The heat exchanger for cool air 3 has a plurality of inner fins 31 that protrudes from the inner wall face of the inner circumferential tube for cool air 33 to the inward of the inner circumferential tube for cool air 33. The heat exchanger for cool air 3 couples to both of a first external-air tube 100E and a cool-air tube 100G. Air (external air) outside of the electric vehicle 1000 in FIG. 1 passes through the first external-air tube 100E and flows into the heat exchanger for cool air 3. In the heat exchanger for cool air 3, the temperature of the air decreases, and the resultant cool air flows out through the cool-air tube 100G (see the following descriptions). The heat exchanger for cool air 3 has a plurality of outer fins 32 along the through channel of air in the heat exchanger for cool air 3. These outer fins 32 protrude from the outer wall face of the inner circumferential tube for cool air 33 to the outward of the inner circumferential tube for cool air 33.

As shown in the dotted arrow of FIG. 3, air travelling through the first external air tube 100E and flowing into the heat exchanger for cool air 3, i.e., external air gives heat to the outer fins 32 to be cool air. The cool air then flows out through the cool-air tube 100G as indicated with the hollow thick arrow of FIG. 3. This external air travelling through the first external-air tube 100E and flowing into the heat exchanger for cool air 3 corresponds to one example of first external air of the present invention. Heat given to the outer fins 32 then is given to the inner fins 31 via the inner circumferential tube for cool air 33. Heat given to the inner fins 31 is given to an end of the heat/acoustic wave conversion component 1 close to the heat exchanger for cool air 3 via the working fluid, and heat is transmitted to the end of the heat/acoustic wave conversion component 1 close to the heat exchanger for warm air 2 due to the thermoacoustic effect of the heat/acoustic wave conversion component 1.

The heat exchanger for warm air 2 has an inner circumferential tube for warm air 23. This inner circumferential tube for warm air 23 has one end connecting to the housing 15 of the heat/acoustic wave conversion component 1, and has the other end connecting to the second transmission tube 100D. The inner circumferential tube for warm air 23 communicates with each of the cells 14 of the heat/acoustic wave conversion component 1 and the second transmission tube 100D, and is filled with the working fluid. After travelling through each of the cells 14, the acoustic waves pass through the inner circumferential tube for warm air 23 and travel through the second transmission tube 100D in the direction indicated with the solid arrow in the second transmission tube 100D. The heat exchanger for warm air 2 has a plurality of inner fins 21 that protrudes from the inner wall face of the inner circumferential tube for warm air 23 to the inward of the inner circumferential tube for warm air 23, The heat exchanger for warm air 2 couples to both of a second external-air tube 100F and a warm-air tube 100H. Air (external air) outside of the electric vehicle 1000 in FIG. 1 passes through the second external-air tube 100F and flows into the heat exchanger for warm air 2. In the heat exchanger for warm air 2, the temperature of the air increases, and the resultant warm air flows out through the warm-air tube 100H (see the following descriptions). The heat exchanger for warm air 2 has a plurality of outer fins 22 along the through channel of air in the heat exchanger for warm air 2. These outer fins 22 protrude from the outer wall face of the inner circumferential tube for warm air 23 to the outward of the inner circumferential tube for warm air 23.

The heat transferred to the end of the heat/acoustic wave conversion component 1 close to the heat exchanger for warm air 2 is given to the inner fins 21 via the working fluid. The heat given to the inner fins 21 then is given to the outer fins 22 via the inner circumferential tube for warm air 23. As shown in the dotted arrow of FIG. 3, air travelling through the second external-air tube 100F and flowing into the heat exchanger for warm air 2, i.e., external air receives heat from the outer fins 22 to be warm air. The warm air then flows out through the warm-air tube 100H as indicated with the hatched thick arrow in the drawing. This external air travelling through the second external-air tube 100F and flowing into the heat exchanger for warm air 2 corresponds to one example of second external air of the present invention.

The heat exchanger for cool air 3 may have the same configuration as that of the heat exchanger for warm air 2. Letting that the heat exchanger for cool air 3 has the same configuration as that of the heat exchanger for warm air 2, the following describes the configuration of the heat exchanger for warm air 2 in details as a typical example of these two heat exchangers.

Figure 7:
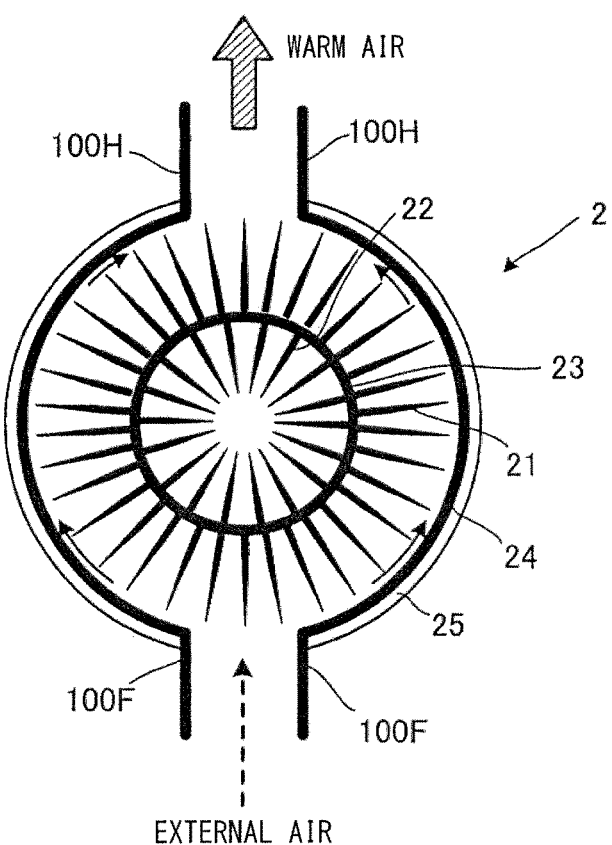
FIG. 7 is a cross-sectional view of the heat exchanger for warm air taken along the line B-B' of FIG. 3.

FIG. 7 is a cross-sectional view of the heat exchanger for warm air 2 taken along the line B-B' of FIG. 3.

As shown in FIG. 7, the heat exchanger for warm air 2 includes an outer circumferential tube for warm air 24 on the outside of the inner circumferential tube for warm air 23. As shown in the dotted arrow of FIG. 7, external air travels through the second external-air tube 100F and flows into the heat exchanger for warm air 2. The external air then branches into two and flows through the space surrounded with the inner circumferential tube for warm air 23 and the outer circumferential tube for warm air 24 as indicated with solid arrows while drawing a curve along the inner circumferential tube for warm air 23. During flowing, the external air receives heat from the outer fins 22 to be warm air, and the warm air flows out through the warm-air tube 100H as indicated with the hatched thick arrow in the drawing. The outer circumferential tube for warm air 24 is surrounded with a heat insulator 25. The heat insulator 25 functions to limit the releasing of heat to the outside of the outer circumferential tube for warm air 24. That is the descriptions on the configuration of the heat exchanger for warm air 2. The heat exchanger for cool air 3 has a similar configuration.

The heat exchanger for warm air 2 of the present invention described referring to FIG. 3 and FIG. 7 may have another configuration.

Figure 8:
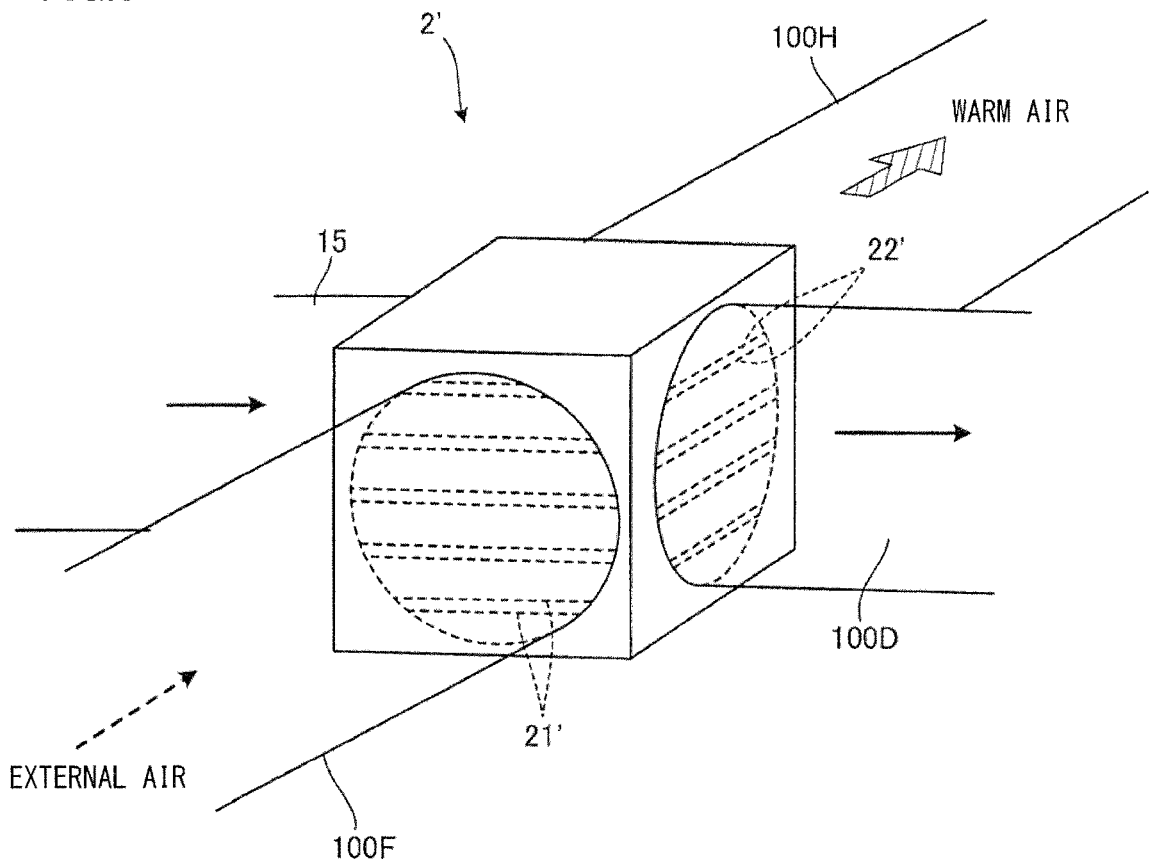
FIG. 8 shows a heat exchanger for warm air having a configuration different from that of the heat exchanger for warm air 2 shown in FIG. 3 and FIG. 7.

FIG. 8 shows a heat exchanger for warm air 2' having a configuration different from that of the heat exchanger for warm air 2 shown in FIG. 3 and FIG. 7.

In FIG. 8, like numerals indicate like components, and their descriptions are omitted. The heat exchanger for warm air 2' connects to the housing 15 of the heat/acoustic wave conversion component 1 as well as to the second transmission tube 100D. The heat exchanger for warm air 2' communicates with each of the cells 14 of the heat/acoustic wave conversion component 1 and the second transmission tube 100D of FIG. 3. The heat exchanger for warm air 2' has slits for working fluid 22' that penetrate through the heat exchanger for warm air 2'. After travelling through each of the cells 14, acoustic waves pass through the slits for working fluid 22' and travel through the second transmission tube 100D in the direction indicated with the solid arrows. The heat exchanger for warm air 2 couples to both of the second external-air tube 100F and the warm-air tube 100H. The heat exchanger for warm air 2' has slits for external air 21' that penetrate through the heat exchanger for warm air 2'. After passing through the second external-air tube 100F as indicated with the dotted arrow of FIG. 8, the external air flows into the heat exchanger for warm air 2'. The external air then changes to warm air while passing through the slits for external air 21' and flows out through the heat exchanger for warm air. These slits for working fluid 22' and slits for external air 21' are configured so as not to intersect in the heat exchanger for warm air 2'. External air therefore does not mix with the working fluid, but can receive heat from the working fluid via the heat exchanger for warm air 2' while passing through the slits for external air 21' of the heat exchanger for warm air. Due to received heat, external air changes to warm air, and then flows out through the warm-air tube 100H as indicated with the hatched thick arrow of the drawing. That is the descriptions on the configuration of the heat exchanger for warm air 2'. The heat exchanger for cool air may have a similar configuration.

That is the descriptions on the configuration of the cool air/warm air generation unit 100A of FIG. 2.

Next the following describes the configuration of the acoustic wave generation unit 100B of FIG. 2 in details.

Figure 9:
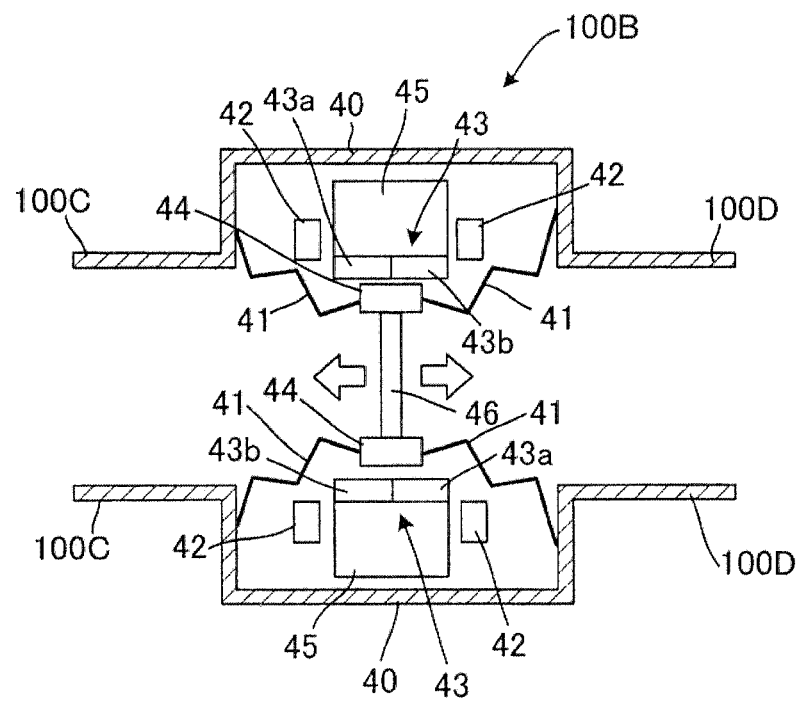
FIG. 9 shows the configuration of the acoustic wave generation unit in FIG. 2.

FIG. 9 shows the configuration of the acoustic wave generation unit 100B in FIG. 3.

The acoustic wave generation unit 100B is an acoustic-wave generation device that includes a linear motor which receives AC power and generates a vibration force in a linear direction. The acoustic wave generation unit 100B includes a diaphragm 46 as a metal thin plate, two movable metal members 44 fixed to two ends of the diaphragm 46, each including the laminate of ferromagnetic metal films, and a housing 40 accommodating the elements of the acoustic wave generation unit 100B. The acoustic wave generation unit 100B has four blade springs 41. One ends of these four blade springs 41 are fixed to two opposed lateral faces of the two movable metal members 44. The other ends of the four blade springs 41 are fixed to the housing 40. The diaphragm 46 and the two movable metal members 44 are supported at the housing 40 via these four blade springs 41 so as to oscillate in the directions of the hollow thick arrows of FIG. 9 due to the elasticity of these four blade springs 41. The acoustic wave generation unit 100B further includes two sets of elements to generate variable magnetic field. Each set includes a fixed metal member 45 including the laminate of ferromagnetic metal films, a coil 42 surrounding the fixed metal member 45, and a permanent magnet 43 fixed to a face of the fixed metal member 45. The permanent magnet 43 has a N-pole part 43a and a S-pole part 43b, and is fixed to the fixed metal member 45 so that both of the N-pole part and the S-pole part of the permanent magnet 43 are disposed on the face of the fixed metal member 45. These two sets of elements to generate variable magnetic field are opposed mutually having the diaphragm 46 between them so that each permanent magnet 43 and the corresponding movable metal member 44 are close to each other. These fixed metal members 45 and coils 42 are fixed to the housing 40 via a not-illustrated mechanism, and so do not move with oscillations, if any, of the diaphragms 46 and the two movable metal members 44.

The housing 40 connects to both of the first transmission tube 100C and the second transmission tube 100D, and the inside of the housing 40 is filled with the working fluid. Before AC current flows through the coils 42 from the supplied AC power, the magnetic field near the N-pole part 43*a* and the magnetic field near the S-pole part 43*b* have the same degree of intensity, although the directions of the magnetic field are different. The movable metal members 44 therefore are located between the N-pole part 43*a* and the S-pole part 43*b* in the horizontal direction of FIG. 9 (the direction indicated with the two hollow thick arrows) as shown in FIG. 9. However, when AC current flows through the coils 42 and the end of the corresponding fixed metal member 45 facing the movable metal member 44 changes to, for example, the N pole due to the principle of electromagnet, the intensity of the magnetic field near the N-pole part 43*a* increases, and the intensity of the magnetic field near the S-pole part 43*b* decreases. As a result, the movable metal member 44 is brought toward the N-pole part 43*a*. When the direction of the AC current flowing through each of coils 42 changes, then the end of the corresponding fixed metal member 45 changes to the S pole. Then the intensity of the magnetic field near the S-pole part 43*b* increases, and the intensity of the magnetic field near the N-pole part 43*a* decreases. As a result, the movable metal member 44 is brought toward the S-pole part 43*b* this time. Such a change of the AC current oscillates the diaphragm 46 fixed to the two movable metal members 44 in the horizontal direction (the direction indicated with the two hollow thick arrows) of FIG. 9. Such oscillations of the diaphragm 46 oscillate the working fluid so as to generate acoustic waves with the frequency in accordance with the frequency of the AC current. The phase and the amplitude of the AC current flowing through these two coils 42 are adjusted so that the two movable metal members 44 receive the forces from the variable magnetic field in the same horizontal direction in FIG. 9, and the forces in the vertical directions of FIG. 9 that the two movable metal members 44 receive from the variable magnetic field are mutually cancelled. As a result, the diaphragm 46 oscillates substantially only in the horizontal direction of FIG. 9, and the diaphragm 46 hardly oscillates vertically. In this way, the acoustic wave generation unit 100E has a linear-motor scheme so as to, when receiving AC power, change the magnetic field linearly in the horizontal direction of FIG. 9 and oscillate the diaphragm 46 in this direction.

A combination of the two fixed metal members 45, the two coils 42, the two permanent magnets 43, the two movable metal members 44 and the four blade springs 41 corresponds to one example of a linear motor of the present invention.

In principle, acoustic waves generated at the acoustic wave generation unit 100B can travel from the acoustic wave generation unit 100B in two directions toward the first transmission tube 100C and toward the second transmission tube 100D. Acoustic waves travelling in one of the directions will be more dominant over time. FIG. 3 shows such a dominant direction of the acoustic waves with the solid arrows.

From the viewpoint of suppressing noise and of better energy efficiency, the frequency of AC power supplied to the acoustic wave generation unit 100B is selected so that the acoustic waves generated has a frequency in the range of 50 Hz or more and 500 Hz or less.

Since the AC power may have a certain range of frequencies, the acoustic waves generated may easily have a mixed high-frequency component higher than 500 Hz or low-frequency component lower than 50 Hz. In such a case, simply selecting the frequency of AC power is not enough to suppress the acoustic waves with high frequencies and lower frequencies. The acoustic wave generation unit 100B of FIG. 9 therefore is configured to adjust the natural frequency of the oscillation system including the four blade springs 41, the diaphragm 46, and the two movable metal members 44. This allows the frequency of acoustic waves generated to be within the above-stated range even when the AC power has a certain range of frequencies. The natural frequency of the oscillation system may be adjusted by adjusting the mass of the elements of this oscillation system and the spring constant of the blade springs 41 (selecting the materials and the dimensions, for example). With this configuration, the acoustic wave generation unit 100B of FIG. 9 significantly suppresses the above-stated acoustic waves of high frequencies and low frequencies. To this end, the acoustic wave generation mechanism of the acoustic wave generation unit preferably includes a frequency-filtering function to actively prevent the acoustic waves with high frequencies and lower frequencies to prevent such acoustic waves more reliably. The following describes such a preferable embodiment.

Figure 10:
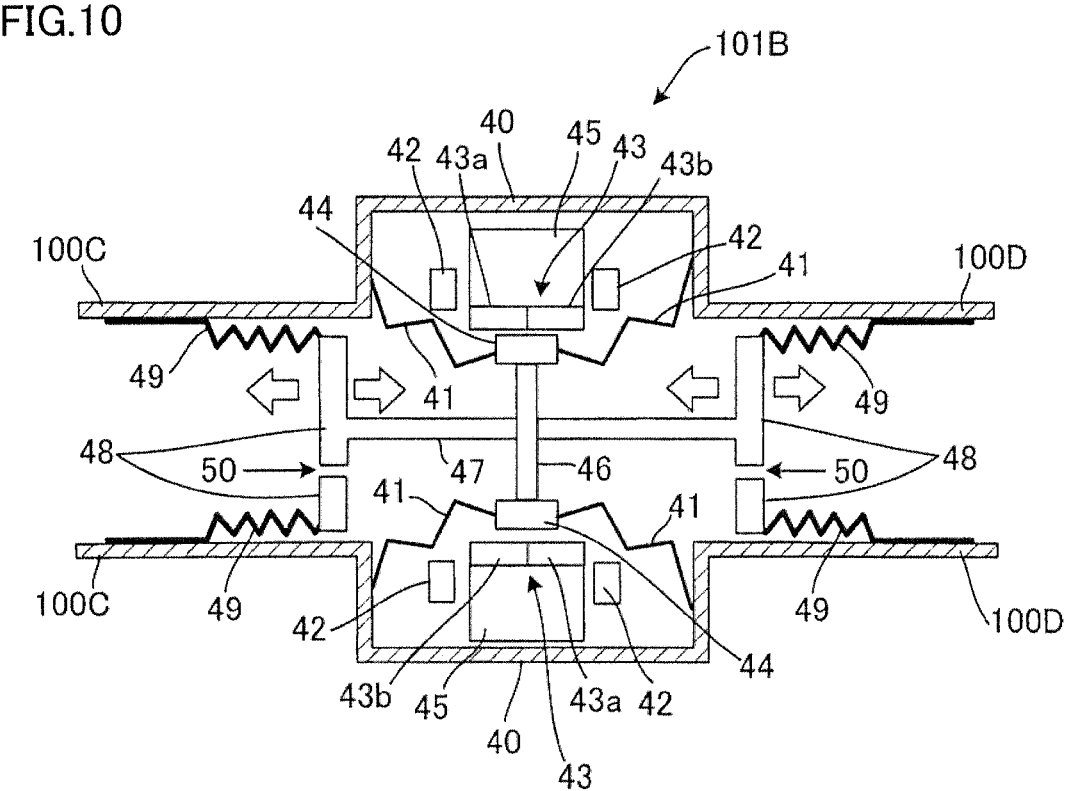
FIG. 10 shows the configuration of an acoustic wave generation unit having a frequency-filtering function that is a modified example of the acoustic wave generation unit of FIG. 9.

FIG. 10 shows the configuration of an acoustic wave generation unit 101B having a frequency-filtering function that is a modified example of the acoustic wave generation unit 100B of FIG. 9.

In FIG. 10, like numerals indicate like components in FIG. 9, and their descriptions may be omitted. The acoustic wave generation unit 101B of FIG. 10 includes, in addition to the elements of the acoustic wave generation unit 100B of FIG. 9, a connecting member 47 that extends in the horizontal direction of FIG. 10 and is fixed to the diaphragm 46 while penetrating through the diaphragm 46, and two plate members 48 fixed to both ends of the connecting member 47. The acoustic wave generation unit 101B has four bellow members 49 each having a shape obtained by folding a flat member into bellows (like accordion curtains). One ends of these four bellow members 49 are fixed to two opposed lateral faces of each of the two plate members 48. The other ends of the four bellow members 44 are fixed to the first transmission tube 100C or the second transmission tube 100D. The connecting member 47 and the two plate members 48 are supported at the housing 40 via these four blade springs 41 so as to oscillate in the directions of the hollow thick arrows of FIG. 10 due to the stretching force resulting from the bellow shape of these four bellow members 49. The acoustic wave generation unit 101B of FIG. 10 is configured so that, when the two movable metal members 44 and the diaphragm 46 oscillate in the horizontal direction of FIG. 10 due to the mechanism as stated above referring to FIG. 9, the connecting member 47 and the two plate members 48 also oscillate together with the oscillations of the two movable metal members 44 and the diaphragm 46. Working fluid oscillates with the oscillations of these two plate members 48, and then the oscillations of the working fluid generate acoustic waves.

Each of the two plate members 48 has a hole section 50 which forms a through hole. The two plate members 48 and the four bellow members 49 seal the first transmission tube 100C and the second transmission tube 100D at a part other than the two hole sections 50. As a result, a part near the connecting part of the first transmission tube 100C with the housing 40, a part near the connecting part of the second transmission tube 100D with the housing 40, the two plate members 48, the four bellow members 49, and the housing 40 define a closed space other than at a part of the two hole sections 50. Note here that when the two plate members 48 (and the diaphragm 46, the connecting member 47, the two plate members 48, and the four bellow members 49) stand still, the two hole sections 50 keep the pressure in the closed space to be substantially the same as the pressure of the inner spaces of the first transmission tube 100C and the second transmission tube 100D outside of the closed space.

When the two plate members 48 oscillate with a very high frequency, the acoustic waves with a high frequency typically do not have very large amplitude. In this case the effective decrease of amplitude, which results from the working fluid entering the hole sections 50 during the oscillations of the two plate members 48, is not ignorable, which practically causes attenuation of the acoustic waves. This case fails to generate the effect of oscillating the working fluid practically, and so fails to generate acoustic waves. Conversely when the two plate members 48 oscillate with a very low frequency, the period of oscillations of the two plate members 48 is too long. This means that there is a plenty of time to let the working fluid pass through the hole sections 50 during the oscillations of the two plate members 48. This results in the working fluid slipping through the hole sections 50 during the oscillations of the two plate members 48, and no pressure difference occurs between both sides of the plate members 48. As a result this case fails to generate the effect of oscillating the working fluid near the two plate members 48 practically, and so this case also fails to generate acoustic waves. When the two plate members 48 oscillate with a frequency between such a very high frequency and very low frequency, then the working fluid near the two plate members 48 oscillate so as to follow the oscillations of the two plate members 48 and generate acoustic waves. In this way when the acoustic wave generation unit 101B of FIG. 10 receives AC power including very high frequency components and very low frequency components, the acoustic wave generation unit 101B does not generate acoustic waves with a very high frequency in accordance with such very high frequency components and does not generate acoustic waves with a very low frequency in accordance with such very high low components, and generates acoustic waves with a frequency between them only. In other words, the acoustic wave generation unit 101B of FIG. 10 generates acoustic waves while blocking high-frequency components and low-frequency components. Note here that the thresholds for blocking high frequency and low frequency depend on the size of the hole sections 50 (depth and diameter of the through holes). Basically smaller hole sections 50 leave a wider range of frequencies without blocking, and larger hole sections 50 narrow the range of frequencies that are left without blocking. Specifically, in the acoustic wave generation unit 101B of FIG. 10, the hole sections 50 forms through holes whose size enable the hole sections 50 to exert a frequency-filtering function such that; when the two plate members 48 oscillate with a high frequency higher than 500 Hz or with a low frequency lower than 50 Hz, the hole sections allow the working fluid to enter the hole sections 50 or to pass through the hole sections 50 so as to suppress oscillations of the working fluid with the high frequency or the low frequency, and when the two plate members 48 oscillate with a frequency in a range of 50 Hz or more and 500 Hz or less, the hole sections 50 allow oscillation of the working fluid at the frequency in the range. As a result the acoustic wave generation unit 101B of FIG. 10 generates acoustic waves with the frequency in the range of 50 Hz or more and 500 Hz or less only, irrespective of the frequency of AC power supplied to the acoustic wave generation unit 101B.

FIG. 10 shows one hole section 50 formed at one plate member 48 as one example, and the number of the hole sections 50 of the present invention may be one or more. To generate the acoustic waves with a frequency of 50 Hz or more, the working fluid receives relatively large flow resistance during passage through the hole sections 50. To this end, the diameter of the hole sections 50 is 1 mm or less preferably. To achieve the effect of attenuating acoustic waves with a high frequency larger than 500 Hz, the hole sections 50 need a certain degree of the total volume. To this end, a plurality of hole sections 50 with such a diameter is formed preferably. Note here that the "diameter of holes" in the above description refers to the equivalent circle diameter (see the above for the definition) of a cross-sectional shape of the hole section 50 in a plane perpendicular to the extending direction of the hole section 50 (i.e., penetrating direction of the through hole). That is, the cross-sectional shape of the hole sections 50 is not limited to a circle, which may be a rectangular cross-sectional shape of a slit, for example. When the hole defines a slit-like through hole in this way, the length of the long sides of the rectangular cross-sectional shape may be increased while satisfying the above condition to obtain relatively large flow resistance, instead of increasing the number of the holes.

A combination of the two fixed metal members 45, the two coils 42, the two permanent magnets 43, the two movable metal members 44 and the four blade springs 41 corresponds to one example of a linear motor of the present invention. A combination of the diaphragm 46, the connecting member 47, the two plate members 48, and the four bellow members 49 corresponds to one example of a sealing oscillation member of the present invention.

Strictly speaking, acoustic waves are generated from the oscillations of the diaphragm 46 and of the two plate members 48 in the above-stated closed space. Most of the acoustic waves, however, will be canceled out each other due to reflection and diffusion of the acoustic waves in this closed space, and the influences from the acoustic waves are small enough to be ignorable.

The cool air/warm air generation system 101 of FIG. 2 as stated above includes a loop-like transmission tube as a whole. The present invention may include a transmission tube of another shape as long as it satisfies the minimum necessary requirement of transmitting the acoustic waves generated at the acoustic wave generation unit 100B to the cool air/warm air generation unit 100A. In one example, the present invention may include a transmission tube of various forms other than the loop shape as a whole that are well-known in the field of the thermoacoustic effect. The following describes a variation of the cool air/warm air generation system satisfying the above requirement.

Figure 11:
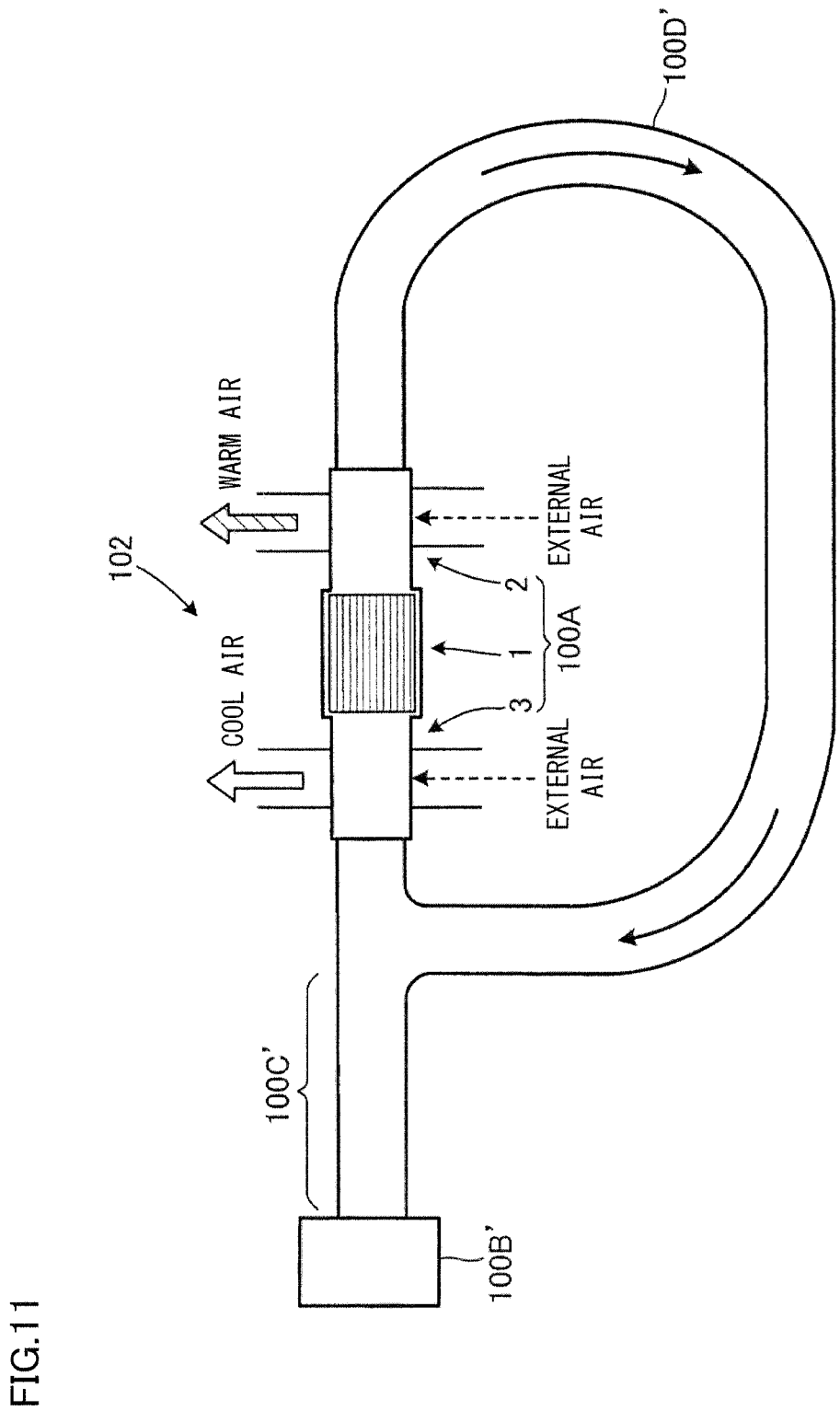
FIG. 11 shows a cool air/warm air generation system that is one variation of the cool air/warm air generation system of FIG. 2 for the shape of the transmission tube.

FIG. 11 shows a cool air/warm air generation system 102 that is one variation of the cool air/warm air generation system 101 of FIG. 2 for the shape of the transmission tube.

In FIG. 11, like numerals indicate like components of the cool air/warm air generation system 101 in FIG. 2, and their descriptions are omitted. The cool air/warm air generation system 102 of FIG. 11 includes, in addition to the cool air/warm air generation unit 100A as stated above, a loop-like transmission tube 100D' connecting to two heat exchangers 2 and 3 disposed at both ends of the cool air/warm air generation unit 100A, and a linear transmission tube 100C' having one end connecting to a part of this loop-like transmission tube 100D'. The cool air/warm air generation system 102 of FIG. 11 includes an acoustic wave generation unit 100B' connecting to the other end of the linear transmission tube 100C'. After sufficient time has passed since the generation of acoustic waves at the acoustic wave generation unit 100B', acoustic waves are generated, which travel through the loop-like transmission tube 100D' in the direction of the solid arrows of FIG. 11, and standing waves of the acoustic waves are generated in the linear transmission tube 100C'. In FIG. 11, a combination of the linear transmission tube 100C' and a part of the loop-like transmission tube 100D', which defines the transmission path of acoustic waves from the acoustic wave generation unit 100B' to the cool air/warm air generation unit 100A, corresponds to one example of a transmission tube of the present invention.

Figure 12:
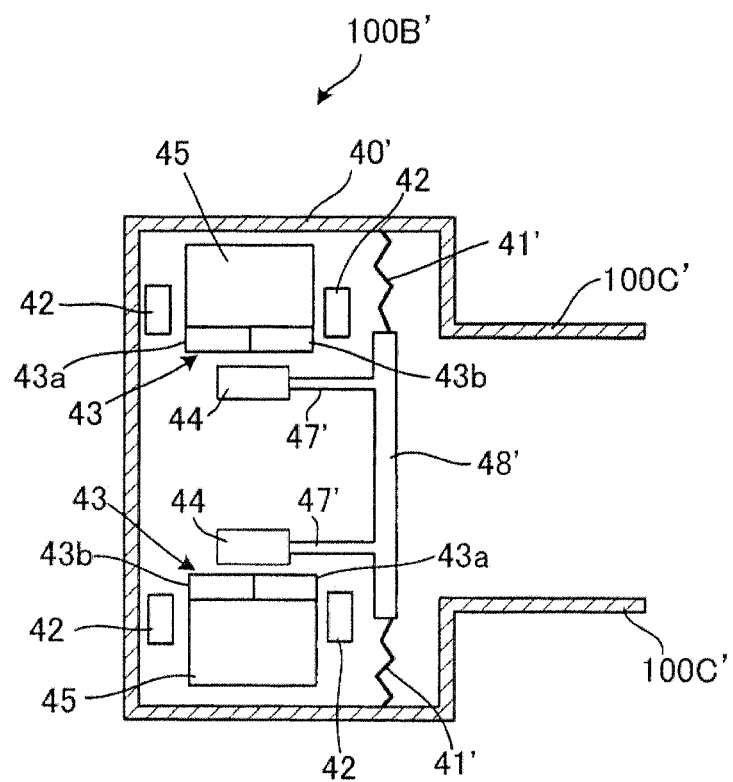
FIG. 12 shows the configuration of the acoustic wave generation unit in the cool air/warm air generation system of FIG. 11.

FIG. 12 shows the configuration of the acoustic wave generation unit 100B' in the cool air/warm air generation system 102 of FIG. 11.

In FIG. 12, like numerals indicate like components of the acoustic wave generation unit 100B in FIG. 9, and their descriptions may be omitted. The acoustic wave generation unit 100B' is a linear-motor type acoustic-wave generation device configured to, when receiving electric power, change the magnetic field linearly and so generate a linear force. The acoustic wave generation unit 100B' includes a plate member 48', two connecting members 47' each having one end fixed to the surface of the plate member 48' and extending from the surface, two movable metal members 44 fixed to leading ends of the two connecting members 47', and a housing 40' accommodating the elements of the acoustic wave generation unit 100B'. The acoustic wave generation unit 100B' has two blade springs 41'. One ends of the two blade springs 41' connect to the plate member 48', and the other ends of the two blade springs 41' connect to the housing 40'. The plate member 48', the two connecting members 47' and the two movable metal members 44 are supported at the housing 40' via these two blade springs 41' so as to oscillate in the horizontal direction of FIG. 12 due to the elasticity of the two blade springs 41'. The acoustic wave generation unit 100B' further includes two sets of elements to generate variable magnetic field. Each set includes a fixed metal member 45 including the laminate of ferromagnetic metal films, a coil 42 surrounding the fixed metal member 45, and a permanent magnet 43 fixed to a face of the fixed metal member 45. The permanent magnet 43 has a N-pole part 43a and a S-pole part 43b, and is fixed to the fixed metal member 45 so that both of the N-pole part and the S-pole part of the permanent magnet 43 are disposed on the face of the fixed metal member 45. These two sets of elements to generate variable magnetic field are opposed mutually. In this state, the permanent magnet 43 and the movable metal member 44 of each set are close to each other. The fixed metal members 45 and coils 42 are fixed to the housing 40' via a not-illustrated mechanism, and so do not move with oscillations, if any, of the plate member 48', the two connecting members 47' and the two movable metal members 44.

The housing 40' connects to the linear transmission tube 100C', and the inside of the housing 40' is filled with the working fluid. Before AC current flows through the coils 42 from the supplied AC power, the magnetic field near the N-pole part 43a and the magnetic field near the S-pole part 43b have the same degree of intensity, although the directions of the magnetic field are different. The movable metal members 44 therefore are located between the N-pole part 43a and the S-pole part 43b in the horizontal direction of FIG. 12, as shown in FIG. 12. However, when AC current flows through the coils 42 and the end of the corresponding fixed metal member 45 facing the movable metal member 44 changes to, for example, the N pole due to the principle of electromagnet, the intensity of the magnetic field near the N-pole part 43a increases, and the intensity of the magnetic field near the S-pole part 43b decreases. As a result, the movable metal member 44 is brought toward the N-pole part 43a. When the direction of the AC current flowing through each of coils 42 changes, then the end of the corresponding fixed metal member 45 changes to the S pole. Then the intensity of the magnetic field near the S-pole part 43b increases, and the intensity of the magnetic field near the N-pole part 43a decreases. As a result, the movable metal member 44 is brought toward the S-pole part 43b this time. Such a change of the AC current oscillates the two connecting plates 47' fixed to the two movable metal members 44 and the plate member 48' to which the two connecting members 47' are fixed in the horizontal direction of FIG. 12. Such oscillations of the plate member 48' oscillate the working fluid so as to generate acoustic waves having the frequency in accordance with the frequency of the AC current. The phase and the amplitude of the AC current flowing through these two coils 42 are adjusted so that the two movable metal members 44 receive the forces from the variable magnetic field in the same horizontal direction in FIG. 12, and the forces in the vertical directions of FIG. 12 that the two movable metal members 44 receive from the variable magnetic field are mutually cancelled. As a result, the plate member 48' oscillates substantially only in the horizontal direction of FIG. 12, and the plate member 48' hardly oscillates vertically. In this way, the acoustic wave generation unit 100B' has a linear-motor scheme so as to, when receiving AC power, change the magnetic field linearly in the horizontal direction of FIG. 12 and oscillate the plate member 48' in this direction.

In FIG. 12, a combination of the two fixed metal members 45, the two coils 42, the two permanent magnets 43, the two movable metal members 44 and the two blade springs 41' corresponds to one example of a linear motor of the present invention.

For the same reason as stated above referring to FIG. 9 and FIG. 10, an acoustic wave generation unit having a frequency filtering function and having a different configuration from that of the acoustic wave generation unit 100B' of FIG. 12 is preferable in the present invention.

Figure 13:
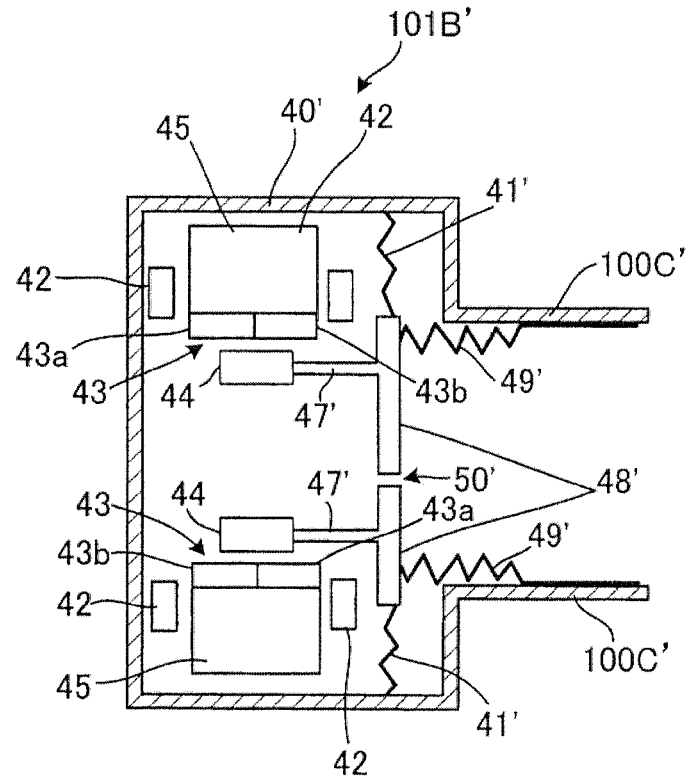
FIG. 13 shows the configuration of an acoustic wave generation unit having a frequency-filtering function that is a modified example of the acoustic wave generation unit of FIG. 12.

FIG. 13 shows the configuration of an acoustic wave generation unit 101B' having a frequency-filtering function that is a modified example of the acoustic wave generation unit 100B' of FIG. 12.

In FIG. 13, like numerals indicate like components in FIG. 12, and their descriptions are omitted. The acoustic wave generation unit 101B' of FIG. 13 has two bellow members 49' each having a shape obtained by folding a flat member into bellows (like folded curtains) in addition to the elements of the acoustic wave generation unit 100B' of FIG. 12. One ends of these two bellow members 49' are fixed to the plate member 48' and the other ends are fixed to the linear transmission tube 100C'. The two movable metal members 44, the two connecting members 47' and the plate member 48' are allowed to oscillate in the horizontal direction due to the stretching force resulting from the bellow shape of the two bellow members 49. The two movable metal members 44, the two connecting members 47' and the plate member 48' therefore are allowed to oscillate in the horizontal direction of FIG. 12 due to the mechanism shown in FIG. 12 even when the unit includes the two bellow members 49'. Working fluid oscillates with the oscillations of the plate member 48', and then the oscillations of the working fluid generate acoustic waves.

The plate member 48' has a hole section 50' to let the working fluid pass through. The plate member 48' and the two bellow members 49' seal the linear transmission tube 100C' other than the hole section 50'. As a result, a part near the connecting part of the linear transmission tube 100C' with the housing 40', the plate member 48', the two bellow members 49', and the housing 40 define a closed space other than at a part of the hole section 50', and the hole section 50' keeps the pressure in the closed space to be substantially the same as the pressure of the inner space of the linear transmission tube 100C' outside of the closed space. The frequency-filtering function of this hole section 50' is the same as the frequency-filtering function of the above-stated hole sections 50 of FIG. 10, and their duplicated descriptions are omitted.

In FIG. 13, a combination of the two fixed metal members 45, the two coils 42, the two permanent magnets 43, the two movable metal members 44 and the two blade springs 41' corresponds to one example of a linear motor of the present invention. A combination of the two connecting member 47', the plate member 48', and the two bellow members 49' corresponds to one example of a sealing oscillation member of the present invention.

Strictly speaking, acoustic waves are generated from the oscillations of the plate member 48' in the above-stated closed space. Most of the acoustic waves, however, will be canceled out each other due to reflection and diffusion of the acoustic waves in this closed space, and the influences from the acoustic waves are small enough to be ignorable.

Figure 14:
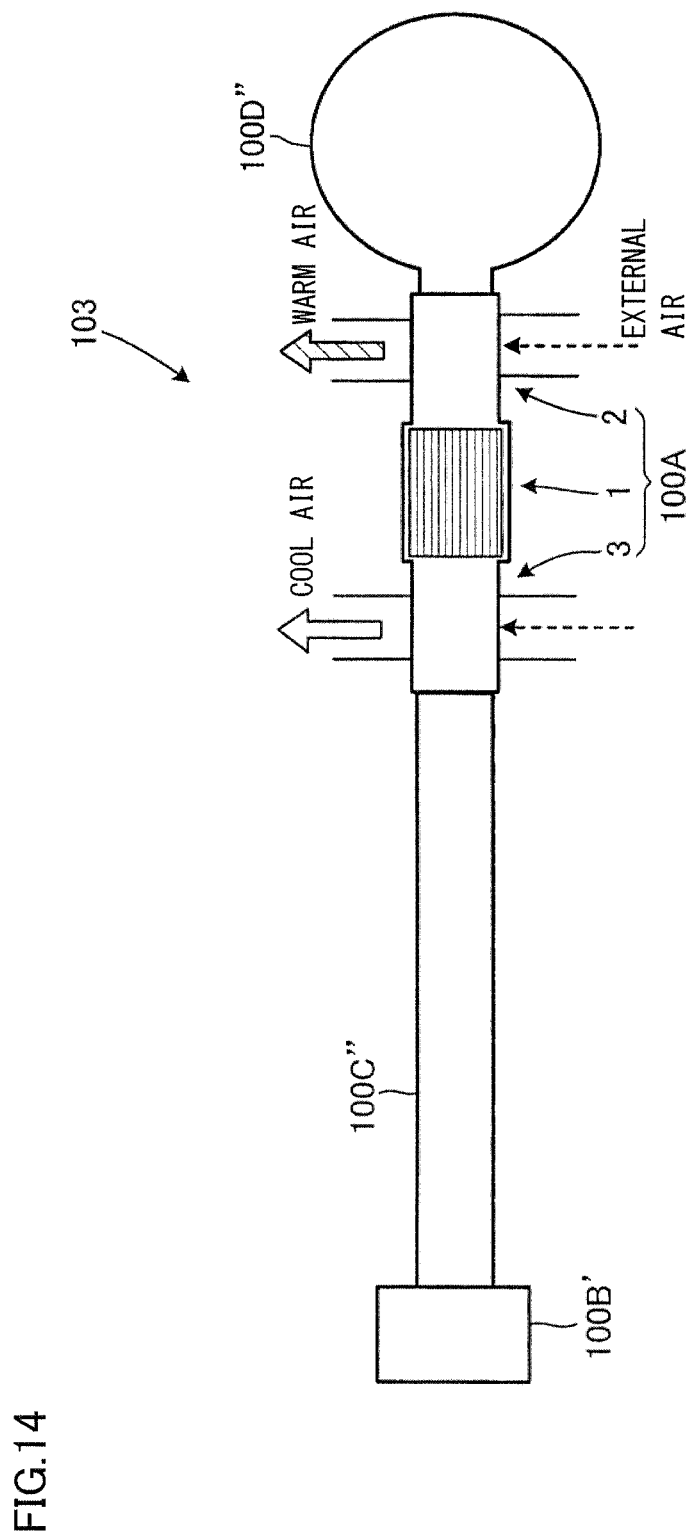
FIG. 14 shows a cool air/warm air generation system that is another variation of the cool air/warm air generation system of FIG. 2 for the shape of the transmission tube.

FIG. 14 shows a cool air/warm air generation system 103 that is another variation of the cool air/warm air generation system 101 of FIG. 2 for the shape of the transmission tube.

In FIG. 14, like numerals indicate like components of the cool air/warm air generation system 101 in FIG. 2 and of the cool air/warm air generation system 102 of FIG. 11, and their descriptions are omitted. The cool air/warm air generation system 103 of FIG. 14 includes, in addition to the cool air/warm air generation unit 100A as stated above, a linear transmission tube 100C" having one end connecting to the heat exchanger for cool air 3 of the cool air/warm air generation unit 100A, a volume part 100D" connecting to the heat exchanger for warm air 2 of the cool air/warm air generation unit 100A, and an acoustic wave generation unit 100B' connecting to the other end of the linear transmission tube 100C". The volume part 100D" is large enough compared with the diameter of the linear transmission tube 100C", and so the end of the linear transmission tube 100C" (specifically the end of a part including the linear transmission tube 100C" and the cool air/warm air generation unit 100A) can be substantially dealt with as an open end. In this case, after sufficient time has passed since the generation of acoustic waves at the acoustic wave generation unit 100B', standing waves of the acoustic waves are generated in the linear transmission tube 100C". The cool air/warm air generation unit 100A generates cool air and warm air based on the standing waves of the acoustic waves. Except that standing waves are used instead of traveling waves, the configuration and the operation of the cool air/warm air generation system 103 of FIG. 14 are the same as those of the cool air/warm air generation system 101 of FIG. 2 and the cool air/warm air generation system 102 of FIG. 11, and their descriptions are omitted. The linear transmission tube 100C" in FIG. 14 corresponds to one example of a transmission tube of the present invention.

The acoustic wave generation unit 100B" of the cool air/warm air generation system 103 in FIG. 14 may be replaced with the acoustic wave generation unit 101B' in the above-stated modified example of FIG. 13. Such a cool air/warm air generation system also is one embodiment of the present invention. The configuration and the operation of this embodiment are similar to those of the above-described embodiments. Their duplicated descriptions therefore are omitted by referring to the above descriptions on the embodiments.

The following describes a method for manufacturing the cool air/warm air generation system 101 of FIG. 2 including the cool air/warm air generation unit 100A of FIG. 3 and FIG. 4 and the acoustic wave generation unit 101B of FIG. 10.

Firstly the following describes a method for manufacturing the cool air/warm air generation unit 100A. Firstly the following describes a method for manufacturing the heat/acoustic wave conversion component 1.

Binder, surfactant, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. As stated above, the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably accounts for 40 to 90 mass % of the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together. The content of the binder is preferably 2 to 20 mass % of the forming raw material as a whole.

The content of water is preferably 7 to 45 mass % of the forming raw material as a whole.

Exemplary surfactant used includes ethylene glycol, dextrin, fatty acid soap, or polyalcohol. They may be used alone or in combination of two or more types. The content of the surfactant is preferably 5 mass % or less of the forming raw material as a whole.

From the viewpoint of forming a cell structure with high Young's modulus as stated above, the materials of the partition wall 11 of the heat/acoustic wave conversion component 1 as the final product preferably include alkaline-earth metals, such as Sr, in the range of 0.2 to 3 mass %, which is the converted amount as the alkaline-earth metal oxides, such as SrO, of the materials of the partition wall 11 as a whole. To this end, during manufacturing of the heat/acoustic wave conversion component 1, alkaline-earth metal carbonates, such as $SrCO_3$, in an amount corresponding to the converged ingredient amount may be added as auxiliary agent in the forming raw material of the heat/acoustic wave conversion component 1. Such addition of alkaline-earth metal carbonates, such as $SrCO_3$, as auxiliary agent promotes densification of the partition wall part during firing. Note here that instead of alkaline-earth metals or together with alkaline-earth metals, alkaline metals preferably are included in the range of 0.02 to 0.2 mass %, which is the converted amount as the alkaline metal oxides, of the materials of the partition wall 11 as a whole.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb formed body including a partition wall defining a plurality of cells and a circumferential wall. The partition wall and the circumferential wall are formed monolithically. For the extrusion, a die having a shape in accordance with the above-stated features of the cell density and the ratio d/D may be used. A preferable material of the die is cemented carbide having wear resistance. Preferably values of the cell density and of the ratio d/D of the honeycomb formed body are determined while considering contraction generated during drying and firing described later as well.

To manufacture such a heat/acoustic wave conversion component 1 including the cells with a high cell density of 620 cells/cm$^2$ or more and 3100 cells/cm$^2$ or less, an extrusion method that is used for a conventional honeycomb structure to load catalyst for exhaust purification without such constraints cannot be used simply (i.e., by simply executing a similar manufacturing method using a different die to form high-density pores) due to the following two problems.

The first problem is that, during extrusion, kneaded material extruded at a high temperature adheres to the holes in a forming die, which easily generates clogging. This problem is mentioned also by Patent Document JP-A-2012-237295 in paragraph [0021].

The second problem is that a die used for a honeycomb structure as in the heat/acoustic wave conversion component 1 as stated above having a high cell density inevitably includes a very thin and minute part (typically a part of about 0.3 mm in thickness). Such a minute part often is damaged (e.g., is torn) by viscous friction during extrusion of the kneaded material.

The manufacturing method of the heat/acoustic wave conversion component 1 as stated above has the following configuration to solve these two problems.

For the first problem, prior to the extrusion using a die (hereinafter called a regular die) corresponding to the heat/acoustic wave conversion component having a high cell density of 620 cells/cm$^2$ or more and 3100 cells/cm$^2$ or less, a kneaded material is extruded using another die (hereinafter called a dummy die) having a very small thickness of ribs that is 0.04 mm or more and 0.09 mm or less. The "thickness of ribs" refers to the thickness of the partition wall of the honeycomb formed body, and means a slit width of the die. Each slit is a hole to discharge the kneaded material and is to determine the shape of the honeycomb structure to be manufactured. In the following, the "thickness of ribs" means the slit width. The extrusion using such a dummy die can remove beforehand the component of the kneaded material that tends to be a cause of the clogging. Then extrusion by a regular die is performed for the kneaded material after this extrusion, whereby clogging as stated above can be suppressed.

The second problem is solved by reducing the viscosity of the kneaded material used for extrusion greatly as compared with the viscosity of a kneaded material used for a conventional honeycomb structure to load catalyst for exhaust purification so as to reduce the viscous friction while keeping the range of a shape-holding property (i.e. the shape of the formed body is not distorted) of the formed body of the heat/acoustic wave conversion component 1 during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the heat/acoustic wave conversion component 1, while the ratio of water in the kneaded material is 25 to 35 parts by mass with reference to 100 parts by mass of the kneaded material solid component that is used to manufacture a conventional honeycomb structure to load catalyst for exhaust purification. When the ratio of water in the kneaded material increases, then viscosity of the kneaded material decreases and adequate fluctuations occur in the shape of the formed body of the heat/acoustic wave conversion component 1. This leads to another advantageous effect that self-induced oscillations of acoustic waves likely occur.

The regular die as stated above forms the cell structure and the circumferential wall monolithically, and so has both of a part to form the cell structure and a part to form the circumferential wall. The ratio d/D of the heat/acoustic wave conversion component 1 as stated above is substantially determined by the forms of these parts of the regular die.

The following continues the description on the following processing for the honeycomb formed body that is obtained by the extrusion.

The obtained honeycomb formed body is dried before firing. A method for drying is not limited especially, and exemplary methods include an electromagnetic wave heating method such as microwave heat-drying and high-frequency induction heating drying and an external heating method such as hot air drying and superheated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell extending direction is not a desired length, it is preferable to cut both of the end faces (end parts) to have the desired length. Although a method for cutting is not limited especially, an exemplary method includes using a circular saw cutter.

Next, this honeycomb formed body is fired. It is preferable to perform calcination before firing to remove the binder and the like. The calcination is preferably performed at 400 to 500° C. for 0.5 to 20 hours in the ambient atmosphere. A method for calcination or firing (main firing) is not limited especially, and they may be performed using an electric furnace, a gas furnace, or the like. For the firing (main firing) conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired cross-sectional shape (e.g., a circle as in FIG. 4) of the heat/acoustic wave conversion component 1, the circumferential part of the honeycomb formed body after firing is cut as needed to correct the shape.

Through these steps, the heat/acoustic wave conversion component 1 is finally completed.

The housing 15 of FIG. 3 may be manufactured by processing a conventionally well-known metal material to form a metal tube, such as iron, copper and stainless steel. For the buffer 12 of FIG. 3, a conventionally known buffer including a fiber material that is natural fiber or synthetic fiber may be used.

Next the following describes a method for manufacturing the two heat exchangers 2 and 3 of FIG. 2. Let that the two heat exchangers 2 and 3 have the same configuration, the following describes the heat exchanger for warm air 2 of the two heat exchangers 2 and 3.

The inner circumferential tube for warm air 23 and the outer circumferential tube for warm air 24 in the heat exchanger for warm air 2 of FIG. 7 are made of a material with high pressure durability against high pressure of the working fluid, high temperature durability against a temperature change from the external air to the warm air, and high heat conductivity, such as a metal material and a ceramic material, and such a material is processed and formed to be a tube as in FIG. 7. The inner fins 21 and the outer fins 22 also may be manufactured by processing or forming a similar material to be the shapes of FIG. 7. The inner fins 21 and the outer fins 22 may be monolithically formed with the inner circumferential tube for warm air 23. For the metal material, a conventionally well-known metal material to form a metal tube, such as iron, copper and stainless steel, may be used. For the raw material of the ceramic material, raw materials of the above-stated materials described for the heat/acoustic wave conversion component 1 may be used. Other conventionally well-known raw materials for ceramic materials also may be used. In one example, carbon powder, such as graphite powder, may be added to SiC powder, which may be used as the raw material of the ceramic material. This forms a high heat-conductivity ceramic material. To use the raw material including carbon powder, such as graphite powder, added to SiC powder, it is preferable that a kneaded material is formed by mixing SiC powder with carbon powder and kneading for adjustment, then drying and firing processing are performed thereto, and then molten silicon (Si) is impregnated in this honeycomb formed body. Such processing can form a configuration where coagulation of metal Si (metal silicon) surrounds the surface of SiC particles after the firing processing, and SiC particles are mutually bonded via metal Si. Such a configuration can achieve high heat durability and heat conductivity in spite of the dense configuration with small porosity.

In addition to the molten silicon (Si), other metals such as Al, Ni, Cu, Ag, Be, Mg, and Ti may be used for impregnation. In this case, after firing, coagulation of metal Si (metal silicon) and other metals used for impregnation surrounds the surface of SiC particles, and SiC particles are mutually bonded via metal Si and other metals used for impregnation. Such a configuration also can achieve high heat durability and heat conductivity in spite of the dense configuration with small porosity.

In this way, manufacturing of the heat exchanger for warm air 2 is finished. The heat exchanger for cool air 3 of FIG. 2 also can be manufactured by a similar method.

That is the descriptions on the method for manufacturing the cool air/warm air generation unit 100A.

Next the following describes a method for manufacturing the acoustic wave generation unit 101B of FIG. 10. The diaphragm 46 includes a metal thin plate, for example. Both of the two movable metal members 44 and the two fixed metal members 45 include the laminate of ferromagnetic metal films (i.e., the laminate core). The two permanent magnets 43 may include a magentized ferromagnetic material, which may be a commercially available material. The two coils 42 may include an electrically conductive metal wire, which may be a commercially available one. The four blade springs 41 and the four bellow members 49 may be prepared by folding a metal plate into the shape of bellows (like folded curtains), for example, so that the plate has elasticity in the direction of returning to the original plate shape. The connecting member 47, the two plate members 48, and the housing 40 may be prepared by processing a metal material, such as iron and stainless steel, to have the shapes of FIG. 10, for example. The hole sections 50 may be formed by boring these holes in the two plate members 48 with a drill, for example. The size of the hole sections 50 may be adjusted with the size of the drill.

That is the descriptions on the method for manufacturing the acoustic wave generation unit 101B of FIG. 10.

The first transmission tube 100C and the second transmission tube 100D of FIG. 2 may be manufactured by processing or forming a highly durable material to have the shapes of FIG. 2. Such a high durable material is not limited especially, and examples include metal such as iron, a hard plastic material, hardened glass, as well as a ceramic material (e.g., those listed for the materials of the heat/acoustic wave conversion component 1 and for the two heat exchangers 2, 3 as stated above).

That is the descriptions on the method for manufacturing the cool air/warm air generation system 101 of FIG. 2 including the cool air/warm air generation unit 100A of FIG. 3 and FIG. 4 and the acoustic wave generation unit 101B of FIG. 10.

In the above descriptions, the cool air/warm air generation system 101 of FIG. 2 generates, from external air that is air outside of the electric vehicle 1000, cool air with a temperature lower than the external air and warm air with a temperature higher than the external air, as described referring to FIG. 1. Note here that the cool air/warm air generation system 101 of FIG. 2 has a functional feature of absorbing heat from one of the two types of intake air (both are external air in the example of FIG. 1) to change the air into air with a decreased temperature, and giving the absorbed heat to the other air to change the other air to air with an increased temperature. This is clear from the above descriptions on the operating principle of the cool air/warm air generation system 101. This means that external air, which is taken into the system as two types of air, is not the functional feature of the cool air/warm air generation system 101 of FIG. 2. In another example, the cool air/warm air generation system 101 of FIG. 2 absorbs heat from or gives heat to air, and recirculates the air. Then the cool air/warm air generation system 101 again may absorb heat from or give heat to the recirculated air. The following describes a cooling/heating system configured to cool and warm an electric vehicle using such a recirculating mechanism of air and the cool air/warm air generation system 101.

Figure 15:
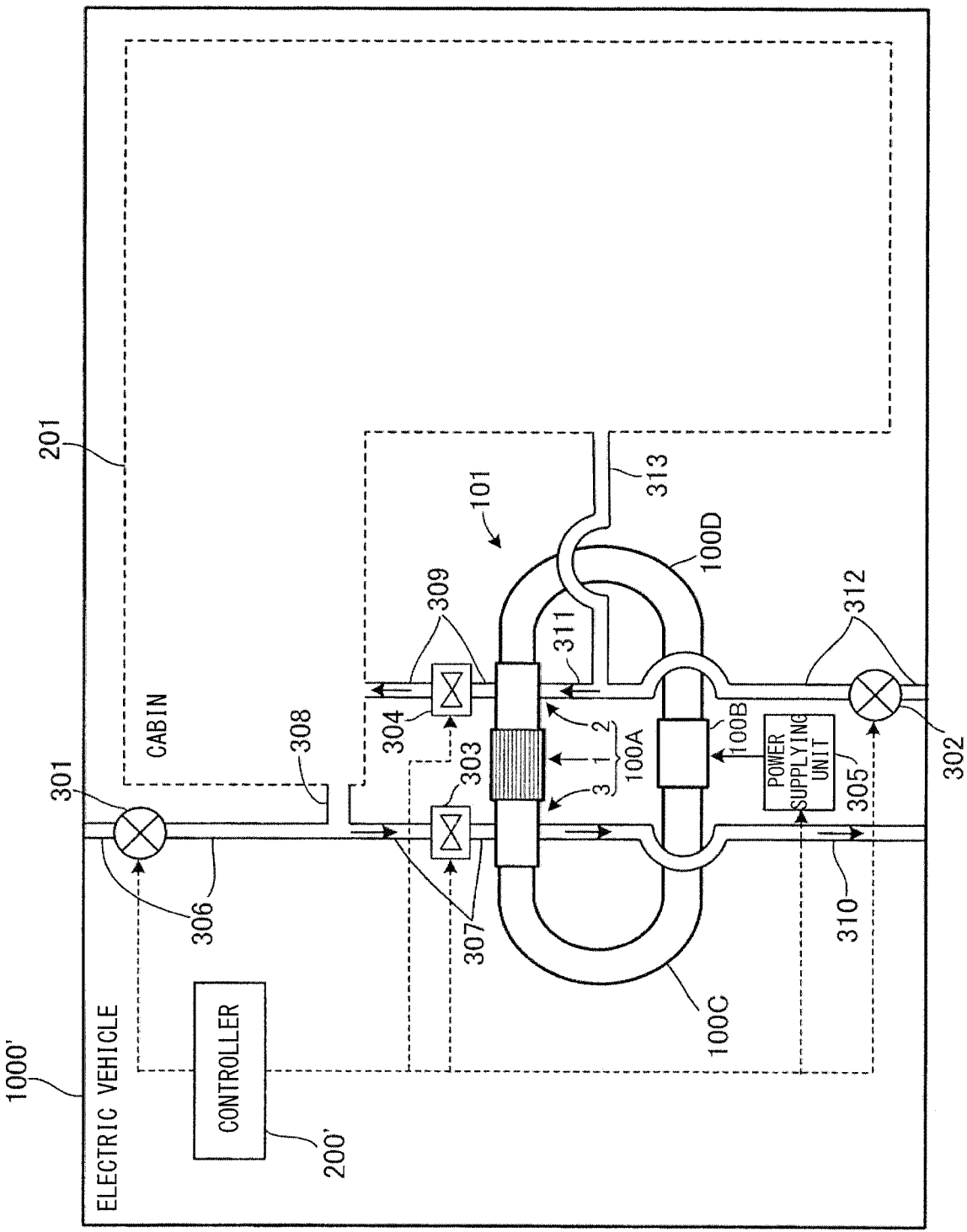
FIG. 15 is a schematic view showing the configuration of a cooling/heating system configured to cool and warm an electric vehicle based on a recirculating mechanism of air and the cool air/warm air generation system of FIG. 2.

FIG. 15 is a schematic view showing the configuration of a cooling/heating system configured to cool and warm an electric vehicle 1000' using a recirculating mechanism of air and the cool air/warm air generation system 101 of FIG. 2.

The cooling/heating system of FIG. 15 includes the cool air/warm air generation system 101 of FIG. 2. The cool air/warm air generation system 101 is configured as described above while referring to FIG. 2 to FIG. 4, FIG. 7, and FIG. 9. In FIG. 15, like numerals indicate like parts in FIG. 2 to FIG. 4, FIG. 7 and FIG. 9, and their descriptions are omitted.

The cooling/heating system of FIG. 15 includes a first inflow tube 311 and a first outflow tube 309 each having one end connecting to the end of the heat exchanger for warm air 2 of the cool air/warm air generation system 101. The cooling/heating system of FIG. 15 further includes a second inflow tube 307 and a second outflow tube 310 each having one end connecting to the end of the heat exchanger for cool air 3 of the cool air/warm air generation system 101. The first outflow tube 309 and the second inflow tube 307 include a first air blower 304 and a second air blower 303, respectively, at a part along the tubes.

The first air blower 304 rotates a fan in the first air blower 304 so as to flow the air in the first outflow tube 309 in the direction indicated with the solid arrow in the first outflow tube 309 of FIG. 15 (the direction of discharging air from the heat exchanger for warm air 2). The end of the first outflow tube 309 on the other side of the end connecting to the heat exchanger for warm air 2 is open to the cabin 201 of the electric vehicle 1000', and air traveling through the first outflow tube 309 is directly discharged into the cabin 201. When the operation of this first air blower 304 discharges air from the heat exchanger for warm air 2, another stream of air flows through the first inflow tube 311 in the direction indicated with the solid arrow in the first inflow tube 311 and is drawn into the heat exchanger for warm air 2.

The end of the first inflow tube 311 on the other side of the end connecting to the heat exchanger for warm air 2 connects to one end of a first valved external-air tube 312 and one end of a first communication tube 313. The other end of the first communication tube 313 is open to the cabin 201, and the other end of the first valved external-air tube 312 is open to the outside of the electric vehicle 1000'. The first valved external-air tube 312 includes a first valve 302 at a part along the tube. When the first valve 302 is open, air flows out of the electric vehicle 1000' or air flows in from the outside of the electric vehicle 1000' via the first valved external-air tube 312. When the first valve 302 is closed, such flowing-in and flowing-out of air is inhibited.

The second air blower 303 rotates a fan in the second air blower 303 so as to flow the air in the second inflow tube 307 in the direction indicated with the solid arrow in the second inflow tube 307 of FIG. 15 (the direction of flowing air into the heat exchanger for cool air 3). Air flowing into the heat exchanger for cool air 3 due to the operation of this second air blower 303 travels through the heat exchanger for cool air 3 and flows out of the heat exchanger for cool air 3, and then travels through the second outflow tube 310 in the direction indicated with the solid arrow in the second outflow tube 310. The end of the second outflow tube 310 on the other side of the end connecting to the heat exchanger for cool air 3 is open to the outside of the electric vehicle 1000', and so air traveling through the second outflow tube 310 is directly discharged to the outside of the electric vehicle 1000'.

The end of the second inflow tube 307 on the other side of the end connecting to the heat exchanger for cool air 3 connects to one end of a second valved external-air tube 306 and one end of a second communication tube 308. The other end of the second communication tube 308 is open to the cabin 201, and the other end of the second valved external-air tube 306 is open to the outside of the electric vehicle 1000'. The second valved external-air tube 306 includes a second valve 301 at a part along the tube. When the second valve 301 is open, air flows out of the electric vehicle 1000' or air flows in from the outside of the electric vehicle 1000' via the second valved external-air tube 306. When the second valve 301 is closed, such flowing-in and flowing-out of air is inhibited.

The cooling/heating system of FIG. 15 includes a power supplying unit 305 to supply AC power to the acoustic wave generation unit 100B of the cool air/warm air generation system 101 in addition to the above-stated components. The cooling/heating system further includes a controller 200' to control this power supplying unit 305 as well as the above-stated first air blower 304, second air blower 303, first valve 302, and second valve 301. The drawing shows control by the controller 200' of these five components with the dotted arrows from the controller 200' to these components. Note here that "AC power" as stated above includes not only electric power having a single period and having the waveforms of simple sine waves and cosine waves but also general electric power having the phase that temporally changes (e.g., waveforms other than sine waves and cosine waves, having the phase that changes periodically). Note here the acoustic wave generation unit 100B receiving such AC power has to generate acoustic waves with a frequency in the range of 50 Hz or more and 500 Hz or less. To this end, AC power having a signal whose phase changes rapidly over time is not supplied to the acoustic wave generation unit 100B.

When the user (driver or passenger) of the electric vehicle 1000' instructs to start heating, the controller 200' controls the power supplying unit 305 so as to supply AC power corresponding to the heating to the acoustic wave generation unit 100B. Receiving the AC power corresponding to the heating, the acoustic wave generation unit 100B generates acoustic waves traveling in the clockwise direction (direction of the solid arrows in FIG. 2) in the loop-like transmission path of the acoustic waves, including the first transmission tube 100C, the acoustic wave generation unit 100B, the second transmission tube 100D, and the cool air/warm air generation unit 100A.

The method of controlling the traveling direction of acoustic waves is described later. The acoustic wave generation unit 100B may generate acoustic waves traveling in the counterclockwise direction in reverse of the solid arrow direction of FIG. 2. When the user (driver or passenger) of the electric vehicle 1000' instructs to start cooling, the controller 200' controls the power supplying unit 305 so as to supply AC power corresponding to the cooling to the acoustic wave generation unit 100B. Receiving the AC power corresponding to the cooling, the acoustic wave generation unit 100B generates acoustic waves traveling in the counterclockwise direction (direction in reverse of the solid arrows in FIG. 2) in the loop-like transmission path of the acoustic waves as stated above.

When the acoustic wave generation unit 100B generates acoustic waves traveling in the direction of the solid arrows of FIG. 2, i.e., the acoustic waves travel through the cells 14 from the end face of the heat/acoustic wave conversion component 1 close to the heat exchanger for cool air 3 to the end face of the heat/acoustic wave conversion component 1 close to the heat exchanger for warm air 2 (see FIG. 3), the acoustic wave generation unit 100B in this operation mode is called a heating mode. When the acoustic wave generation unit 100B generates acoustic waves traveling in the direction in reverse of the solid arrows of FIG. 2, i.e., the acoustic waves travel through the cells 14 from the end face of the heat/acoustic wave conversion component 1 close to the heat exchanger for warm air 2 to the end face of the heat/acoustic wave conversion component 1 close to the heat exchanger for cool air 3 (see FIG. 3), the acoustic wave generation unit 100B in this operation mode is called a cooling mode. The acoustic wave generation unit 100B selectively executes the heating mode or the cooling mode.

When the user (driver or passenger) instructs to start heating or cooling, the controller 200' controls the first air blower 304 to flow the air in the first outflow tube 309 and in the first inflow tube 311 in the direction of the solid arrows described in the first outflow tube 309 and the first inflow tube 311 of FIG. 15 as stated above. The controller 200' then controls the second air blower 303 to flow the air in the second inflow tube 307 and in the second outflow tube 310 in the direction of the solid arrows described in the second inflow tube 307 and the second outflow tube 310 of FIG. 15 as stated above.

The cooling/heating system of FIG. 15 has two types of the operation mode of the cool air/warm air generation unit 100A, including a driving mode that focuses on an increase or a decrease of temperature in the cabin 201 and a ventilation mode focusing on the ventilation in the cabin 201. In the driving mode, the cool air/warm air generation unit 100A obtains external air from the outside of the electric vehicle 1000' via the second valved external-air tube 306 and the second inflow tube 307, and obtains the air in the cabin 201 from the cabin 201 via the first communication tube 313 and the first inflow tube 311. In the ventilation mode, the cool air/warm air generation unit 100A obtains external air from the outside of the electric vehicle 1000' via the first valved external-air tube 312 and the first inflow tube 311, and obtains the air in the cabin 201 from the cabin 201 via the second inflow tube 307 and the second communication tube 308. The driving mode of the cool air/warm air generation unit 100A is implemented by the controller 200' that controls the first valve 302 and the second value 301 to close the first valve 302 and open the second valve 301. The ventilation mode of the cool air/warm air generation unit 100A is implemented by the controller 200' that controls the first valve 302 and the second value 301 to open the first valve 302 and close the second valve 301. The cool air/warm air generation unit 100A selectively executes the driving mode or the ventilation mode.

External air obtained via the second valved external-air tube 306 and the second inflow tube 307 corresponds to one example of first external air of the present invention, and air in the cabin 201 obtained from the cabin 201 via the first communication tube 313 and the first inflow tube 311 corresponds to one example of first cabin air of the present invention. External air obtained via the first valved external-air tube 312 and the first inflow tube 311 corresponds to one example of second external air of the present invention, and air in the cabin 201 obtained from the cabin 201 via the second inflow tube 307 and the second communication tube 308 corresponds to one example of second cabin air of the present invention.

For the purpose of illustration, the following refers to the mode where the acoustic wave generation unit 100B executes the heating mode and the cool air/warm air generation unit 100A executes the driving mode as a driving mode during heating. The following refers to the mode where the acoustic wave generation unit 100B executes the heating mode and the cool air/warm air generation unit 100A executes the ventilation mode as a ventilation mode during heating. The following refers to the mode where the acoustic wave generation unit 100B executes the cooling mode and the cool air/warm air generation unit 100A executes the driving mode as a driving mode during cooling. The following refers to the mode where the acoustic wave generation unit 100B executes the cooling mode and the cool air/warm air generation unit 100A executes the ventilation mode as a ventilation mode during cooling.

The following describes each of these driving mode during heating, ventilation mode during heating, driving mode during cooling and ventilation mode during cooling. Firstly the following describes the modes during heating.

In the driving mode during heating, the first valve 302 is closed, which therefore inhibits flowing-in and flowing-out of air between the electric vehicle 1000' and the outside of the electric vehicle 1000' via the first valved external-air tube 312. Air drawn from the cabin 201, traveling through the first communication tube 313 and flowing into the first inflow tube 311 therefore forms the air flow in the first outflow tube 309 and the first inflow tube 311 (see the solid arrows in these tubes of FIG. 15). That is, the circulating path of air is defined, which passes through the cabin 201, the first communication tube 313, the first inflow tube 311, the heat exchanger for warm air 2, and the first outflow tube 309 in this order and returns to the cabin 201. The air flowing into the heat exchanger for warm air 2 receives heat from the heat exchanger for warm air 2 and so increases in temperature compared with the temperature before flowing into there due to the mechanism described referring to FIG. 2 to FIG. 4 and FIG. 7, and then flows out of the heat exchanger for warm air 2. Air in this circulating path receives heat every time the air passes through the heat exchanger for warm air 2, and is heated. The temperature of the air in the cabin 201 therefore increases effectively.

In the driving mode during heating, the second valve 301 is open, which allows external air to flow in from the outside of the electric vehicle 1000' via the second valved external-air tube 306, and so only this external air passing through this second valved external-air tube 306 forms the air flow in the second inflow tube 307 and the second outflow tube 310 as stated above (see the solid arrows in these tubes of FIG. 15). Strictly speaking, to suppress a pressure increase of air in the cabin 201 with a temperature increase in air in the cabin 201, a limited amount of air flows into the second inflow tube 307 from the cabin 201 via the second communication tube 308. Since the amount of such air is not so much, this does not affect the temperature increase in the cabin 201 by the above-stated circulating path of the air.

The external air traveling through the second inflow tube 307 passes through the heat exchanger for cool air 3, and travels through the second outflow tube 310 to be discharged to the outside of the electric vehicle 1000'. The external air flowing into the heat exchanger for cool air 3 gives heat to the heat exchanger for cool air 3 and so decreases in temperature compared with the temperature before flowing into there due to the mechanism described referring to FIG. 2 to FIG. 4 and FIG. 7, and then flows out of the heat exchanger for cool air 3. As described above referring to FIG. 2 to FIG. 4 and FIG. 7, the heat given to the heat exchanger for cool air 3 corresponds to the heat supplied from the heat exchanger for warm air 2 to the air flowing into the heat exchanger for warm air 2.

In the ventilation mode during heating, the first valve 302 is open, which therefore enables flowing-in of external air from the outside of the electric vehicle 1000' via the first valved external-air tube 312. In the ventilation mode during heating, external air passing through the first valved external-air tube 312 from the outside of the electric vehicle 1000' flows into the first inflow tube 311 in this way. This external air forms the air flow in the first outflow tube 309 and the first inflow tube 311 as stated above (see the solid arrows in these tubes of FIG. 15). The external air passing through the first inflow tube 311 and flowing into the heat exchanger for warm air 2 receives heat from the heat exchanger for warm air 2 to increase in temperature compared with before flowing into there. Such air flows out of the heat exchanger for warm air 2 and then flows into the cabin 201 via the first outflow tube 309. Strictly speaking, a limited amount of air is drawn from the cabin 201 and flows into the first inflow tube 311 via the first communication tube 313. Since the amount of such air is not so much, this does not affect the flowing-in of external air from the outside of the electric vehicle 1000' via the first valved external-air tube 312.

In the ventilation mode during heating, in addition to such external air flowing into the cabin 201 from the outside of the electric vehicle 1000', the closed second valve 301 inhibits the flowing-out and flowing-in of air between the electric vehicle 1000' and the outside of the electric vehicle 1000' via the second valved external-air tube 306. Air therefore flows out of the cabin 201 via the second communication tube 308 so as to be pushed out from the cabin 201. This results in ventilation of the air in the cabin 201. Air flowing out via the second communication tube 308 then flows into the heat exchanger for cool air 3 via the second inflow tube 307, and gives heat to the heat exchanger for cool air 3 to decrease in temperature compared with the temperature before flowing into there. Such air is discharged to the outside of the electric vehicle 1000' via the second outflow tube 310. The heat given to the heat exchanger for cool air 3 corresponds to the heat supplied from the heat exchanger for warm air 2 to the external air flowing into the heat exchanger for warm air 2.

Air flowing into the heat exchanger for cool air 3 is warm air that is originally present in the cabin 201. When such warm air passes through the heat exchanger for cool air 3, the warm air gives the heat to the heat exchanger for cool air 3. This heat is then supplied to the external air passing through the heat exchanger for warm air 2. In other words, the ventilation mode during heating collects heat of warm air released from the cabin 201 by ventilation, and this heat is reused for heating of the cabin 201. In this way, the cooling/heating system of FIG. 15 is configured to avoid excessive discarding of heat during ventilation.

The controller 200' performs switching between the driving mode during heating and the ventilation mode during heating as described above. Timing of the mode switching is not limited especially. In one example, the controller 200' may perform switching from the driving mode during heating to the ventilation mode during heating and from the ventilation mode during heating to the driving mode during heating with predetermined time intervals (this means the mode switching is automatically performed). In another example, every time the user (driver or passenger) instructs the mode switching, the controller 200' may switch the mode.

Next the following describes the modes during cooling.

When the user (driver or passenger) instructs to start cooling, the acoustic wave generation unit 100B receives AC power corresponding to the cooling from the power supplying unit 305 and generates acoustic waves traveling in the reverse direction of the heating (i.e., in reverse of the solid arrows of FIG. 2) as stated above. Note here that the traveling direction of the acoustic waves is controllable by adjusting the waveforms of the AC power signals supplied from the power supplying unit 305 to the acoustic wave generation unit 100B. The following describes controlling of the traveling direction of acoustic waves.

As described referring to FIG. 9, AC power supplied to the acoustic wave generation unit 100B temporally changes the magnitude relationship between the intensity of the magnetic field near the N-pole part 43*a* of the permanent magnet 43 and the intensity of the magnetic field near the S-pole part 43*b* of the permanent magnet 43. As a result, acoustic waves are generated. More specifically the magnitude relationship of the intensity of the magnetic field as stated above changes in accordance with the phase of current flowing through each coil 42. This changes the direction of attracting the movable metal member 44 between the N-pole part 43*a* and the S-pole part 43*b*, whereby the movable metal member 44 oscillates to generate acoustic waves. The waveform of the AC power signals may be adjusted so as to adjust the current flowing through each coil 42. In one example, such adjustment may be made so that the maximum value of the magnetic-field intensity near the N-pole part 43*a* is relatively larger than the maximum value of the magnetic-field intensity near the S-pole part 43*b*, whereby the movable metal member 44 will receive a larger force when the N-pole part 43*a* attracts the movable metal member 44 than when the S-pole part 43*b* attracts the movable metal member 44. In this case, the movement of the working fluid in the direction toward the N-pole part 43*a* (i.e., to the left in FIG. 9) becomes relatively dominant, and so acoustic waves traveling to the left in FIG. 9 are generated mainly. Conversely the waveform of the AC power signals may be adjusted so that the maximum value of the magnetic-field intensity near the S-pole part 43*b* is relatively larger than the maximum value of the magnetic-field intensity near the N-pole part 43*a*, whereby acoustic waves traveling to the right in FIG. 9 are generated mainly. In this way the traveling direction of the acoustic waves is controllable by adjusting the waveforms of the AC power signals supplied from the power supplying unit 305 to the acoustic wave generation unit 1008. The AC power corresponding to the heating as stated above has the waveform of the signal so as to generate acoustic waves traveling in the clockwise direction (direction of the solid arrows in FIG. 2) in the loop-like transmission path of the acoustic waves of FIG. 2. The AC power corresponding to the cooling as stated above has the waveform of the signal so as to generate acoustic waves traveling in the counterclockwise direction (reverse direction of the solid arrows in FIG. 2) in the loop-like transmission path of the acoustic waves of FIG. 2.

Such a method of adjusting the waveform of the AC power signal is the simplest way to control the traveling direction of the acoustic waves. Another controlling method may be used. In one example, a volume part may be disposed at a part along the first transmission tube 100C or the second transmission tube 100D, where the volume part has a variable shape or a variable volume. Adjustment of the shape or the volume of the volume part may control the traveling direction of the acoustic waves so that the acoustic waves travel easily in one of the directions in the loop-like transmission path.

The descriptions return to the modes during cooling.

In the driving mode during cooling, the first valve 302 is closed, which therefore inhibits flowing-in and flowing-out of air between the electric vehicle 1000' and the outside of the electric vehicle 1000' via the first valved external-air tube 312. Air drawn from the cabin 201, traveling through the first communication tube 313 and flowing into the first inflow tube 311 therefore forms the air flow in the first outflow tube 309 and the first inflow tube 311 (see the solid arrows in these tubes of FIG. 15). That is, the circulating path of air is defined, which passes through the cabin 201, the first communication tube 313, the inflow tube 311, the heat exchanger for warm air 2, and the first outflow tube 309 in this order and returns to the cabin 201.

As described above, acoustic waves during cooling travels reversely i.e., counterclockwise, from the acoustic waves during heating (see the clockwise arrows in FIG. 2). The heat exchanger for warm air 2 and the heat exchanger for cool air 3 of the cool air/warm air generation unit 100A have the names of the heat exchanger for "warm air" and the heat exchanger for "cool air", respectively, based on their roles when the acoustic waves travel as the clockwise arrows of FIG. 2. Note here that these heat exchangers have the same configuration. When acoustic waves travel reversely from that of FIG. 2, their roles therefore are exchanged irrespective of their names. That is, when acoustic waves travel reversely from FIG. 2, then the air flowing into the heat exchanger for warm air 2 gives heat to the heat exchanger for warm air 2 and so decreases in temperature compared with the temperature before flowing into the heat exchanger for warm air 2 due to the same mechanism as that of the heat exchanger for cool air 3 of FIG. 2 to FIG. 4 and FIG. 7 as described above, and then flows out of the heat exchanger for warm air 2. The air flowing into the heat exchanger for cool air 3 receives heat from the heat exchanger for cool air 3 and so increases in temperature compared with the temperature before flowing into there due to the same mechanism as that of the heat exchanger for warm air 2 of FIG. 2 to FIG. 4 and FIG. 7 as described above, and then flows out of the heat exchanger for cool air 3.

In this way air in this circulating path in the driving mode during cooling gives heat to the heat exchanger for warm air 2 every time the air passes through the heat exchanger for warm air 2, and is cooled. The temperature of the air in the cabin 201 therefore decreases effectively.

In the driving mode during cooling, the second valve 301 is open, which allows air to flow in from the outside of the electric vehicle 1000' via the second valved external-air tube 306, and so only the external air passing through this second valved external-air tube 306 forms the air flow in the second inflow tube 307 and the second outflow tube 310 as stated above (see the solid arrows in these tubes of FIG. 15). Strictly speaking, to suppress a pressure decrease of air in the cabin 201 with a temperature decrease in air in the cabin 201, a limited amount of external air flows into the cabin 201 from the valved external-air tube 306 via the second communication tube 308. Since the amount of such external air is not so much, this does not affect the temperature decrease in the cabin 201 by the above-stated circulating path of the air.

The external air traveling through the second inflow tube 307 passes through the heat exchanger for cool air 3, and travels through the second outflow tube 310 to be discharged to the outside of the electric vehicle 1000'. The external air flowing into the heat exchanger for cool air 3 then receives heat from the heat exchanger for cool air 3 to increase in temperature compared with before flowing into there. Such air flows out of the heat exchanger for cool air 3. The heat corresponds to heat that the air flowing into the heat exchanger for warm air 2 gives the heat exchanger for warm air 2.

In the ventilation mode during cooling, the first valve 302 is open. This therefore enables flowing-in of external air from the outside of the electric vehicle 1000' via the first valved external-air tube 312. In the ventilation mode during cooling, external air passing through the first valved external-air tube 312 from the outside of the electric vehicle 1000' flows into the first inflow tube 311 in this way. This external air forms the air flow in the first outflow tube 309 and the first inflow tube 311 as stated above (see the solid arrows in these tubes of FIG. 15). The external air passing through the first inflow tube 311 and flowing into the heat exchanger for warm air 2 gives heat to the heat exchanger for warm air 2 to decrease in temperature compared with before flowing into there. Such air travels through the first outflow tube 309 and flows into the cabin 201. Note here that the external air flowing into the heat exchanger for warm air 2 and giving heat to the heat exchanger for warm air 2 means that the external air flowing into the heat exchanger for warm air 2 receives cold heat from the heat exchanger for warm air 2. Strictly speaking, a limited amount of air is drawn from the cabin 201 and flows into the first inflow tube 311 via the first communication tube 313. Since the amount of such air is not so much, this does not affect the flowing-in of external air from the outside of the electric vehicle 1000' via the first valved external-air tube 312.

In the ventilation mode during cooling, in addition to such external air flowing into the cabin 201 from the outside of the electric vehicle 1000', the closed second valve 301 inhibits the flowing-out and flowing-in of air between the electric vehicle 1000' and the outside of the electric vehicle 1000' via the second valved external-air tube 306. Air therefore flows out of the cabin 201 via the second communication tube 308 so as to be pushed out from the cabin 201. This results in ventilation of the air in the cabin 201. Air flowing out via the second communication tube 308 then flows into the heat exchanger for cool air 3 via the second inflow tube 307, and receives heat from the heat exchanger for cool air 3 to increase in temperature compared with the temperature before flowing into there. Such air is discharged to the outside of the electric vehicle 1000' via the second outflow tube 310. Note here that the air flowing into the heat exchanger for cool air 3 and receiving heat from the heat exchanger for cool air 3 means that the air flowing into the heat exchanger for cool air 3 supplies cold heat to the heat exchanger for cool air 3. This cold heat supplied to the heat exchanger for cool air 3 corresponds to the cold heat supplied from the heat exchanger for warm air 2 to the external air flowing into the heat exchanger for warm air 2.

Air flowing into the heat exchanger for cool air 3 is cool air that is originally present in the cabin 201. When such cool air passes through the heat exchanger for cool air 3, the air gives the cold heat to the heat exchanger for cool air 3. This cold heat is then supplied to the external air passing through the heat exchanger for warm air 2. In other words, the ventilation mode during cooling collects cold heat of cool air released from the cabin 201 by ventilation, and this cold heat is reused for cooling of the cabin 201. In this way, the cooling/heating system of FIG. 15 is configured to avoid excessive discarding of cold heat during ventilation.

The controller 200' performs switching between the driving mode during cooling and the ventilation mode during cooling as described above. The timing of mode switching is not limited especially. In one example, the controller 200' may perform switching from the driving mode during cooling to the ventilation mode during cooling and from the ventilation mode during cooling to the driving mode during cooling with predetermined time intervals (this means the mode switching is automatically performed). In another example, every time the user (driver or passenger) instructs the mode switching, the controller 200' may switch the mode.

That is the descriptions on the cooling/heating system configured to recirculate the air from which heat is absorbed or to which heat is given with the cool air/warm air generation system 101 of FIG. 2 and to absorb heat or give heat again with the cool air/warm air generation system 101.

The cooling/heating system of FIG. 15 as stated above includes the cool air/warm air generation unit 100A having the heat/acoustic wave conversion component 1 as stated above referring to FIG. 3 and FIG. 4 and the heat exchanger for warm air 2 and the heat exchanger for cool air 3 as stated above referring to FIG. 3 and FIG. 7. The cooling/heating system may include a cool air/warm air generation unit having the heat/acoustic wave conversion component 1' as stated above referring to FIG. 5 and FIG. 6 instead of the heat/acoustic wave conversion component 1. The cooling/heating system may include a cool air/warm air generation unit having two heat exchangers of the same configuration as that of the heat exchanger for warm air 2' as stated above referring to FIG. 8, instead of the heat exchanger for warm air 2 and the heat exchanger for cool air 3. The configuration of FIG. 15 in the above includes the acoustic wave generation unit 100B as stated above referring to FIG. 9, and may include the acoustic wave generation unit 101B as stated above referring to FIG. 10 instead of the acoustic wave generation unit 100B. The configuration of FIG. 15 in the above includes the cool air/warm air generation system 101 having a loop-like transmission tube as a whole, and may include the cool air/warm air generation system 102 as stated above referring to FIG. 11 or the cool air/warm air generation system 103 as stated above referring to FIG. 14, which are different in shape of the transmission tube, instead of the cool air/warm air generation system 101.

Such various modified examples of the cooling/heating system of FIG. 15 simply include the replaced components instead of the corresponding components in the cool air/warm air generation system 101 of FIG. 2 in the descriptions of FIG. 15, and the details of such replaced components are as described above. The descriptions on these various modified examples of the cooling/heating system of FIG. 15 therefore are omitted.

EXAMPLES

The following describes specific examples having the advantageous effects of the present invention. The present invention is not limited to the following examples.

Example 1

Example 1 is one specific example of the cool air/warm air generation system 101 of FIG. 2 including the cool air/warm air generation unit 100A of FIG. 3 and FIG. 4 and the acoustic wave generation unit 100B of FIG. 10.

Firstly the following describes a cool air/warm air generation unit of Example 1. Firstly the following describes a heat/acoustic wave conversion component of the cool air/warm air generation unit.

The cool air/warm air generation unit of Example 1 included a honeycomb structure as the heat/acoustic wave conversion component, and the honeycomb structure had both of the partition wall and the circumferential wall made of a cordierite material having a heat conductivity of 1.0 W/mK. The region (cell-structured region) occupied by the cross section of the partition wall and the cross section of the cells in a cross section of the heat/acoustic wave conversion component perpendicular to the extending direction of the cells had the cell density of 775 cells/cm$^2$ (5000 cpsi). This heat/acoustic wave conversion component had a round pillar shape, and a portion of the whole of the heat/acoustic wave conversion component except the circumferential wall (a cell structure body) had a round pillar shape that was concentric with the round pillar shape of the heat/acoustic wave conversion component as a whole. That is, the heat/acoustic wave conversion component as a whole had a round cross section, and the cell-structured region had a round shape that was concentric with the round shape of the cross section of the heat/acoustic wave conversion component as a whole. Specifically the heat/acoustic wave conversion component as a whole had a round cross shape of 50 mm in diameter, and the cell-structured region had a round shape of 45 mm in diameter. Therefore the ratio d/D of the diameter d of the cell-structured region to the diameter D of the cross section of the heat/acoustic wave conversion component as a whole was 45 mm/50 mm=0.9. The cell structure had the Young's modulus of 13 GPa. The overall length L of the heat/acoustic wave conversion component along the cell extending direction was 50 mm.

The cell density was obtained as follows. An image of a cross section of the heat/acoustic wave conversion component perpendicular to the extending direction of the cells was taken by a microscope, and the area S of the cell-structured region and the total number N of the cells were obtained from the taken image. Then the cell density was obtained as the value of N/S.

The heat conductivity was measured as follows. Firstly, a plate-shaped test sample was cut out from the circumferential wall of the heat/acoustic wave conversion component, and this plate-shaped test sample was sandwiched between spacers whose heat conductivity was known (e.g., made of metals, such as copper and stainless steel). Then, the one side was heated to 30° C. to 200° C., and the other side was cooled to 20 to 25° C. In this way, a certain temperature difference was given in the thickness direction of the test sample. Then, the amount of heat flow transmitted in the test sample was obtained based on the temperature gradient in the spacers, and this amount of heat flow was divided by the temperature difference to calculate the heat conductivity.

The diameter of the cross section of the heat/acoustic wave conversion component as a whole and the diameter of the cell-structured region were obtained based on the areas of the cross section of the heat/acoustic wave conversion component as a whole and of the cell-structured region in the taken image as stated above, and in accordance with the equation to define the equivalent circle diameter specified as $2\times(\text{area}/\pi)^{1/2}$. Naturally these diameters calculated in accordance with the equation to define the equivalent circle diameter were substantially the same as the measurements of the maximum distance between two points along the outer circumference of the cross section of the heat/acoustic wave conversion component as a whole and of the cell-structured region.

The Young's modulus was measured and calculated by the bending resonance method complying with JIS R1602. Specifically a test piece having the dimensions of 2 mm×6 mm×50 mm was cut out from the cell structure, and the primary resonance frequency of the test piece was measured by the primary resonance frequency measurement method complying with the bending resonance method. 50 mm in the dimensions was the length of the test piece along the extending direction of the cells, and 6 mm was the width of the test piece in the direction perpendicular to the extending direction of the cells. 2 mm in the dimensions was the thickness of the test piece along the direction perpendicular to both of the extending direction of the cells and the width direction of the test piece. When a test piece is cut out from such a heat/acoustic wave conversion component, the width direction and the thickness direction may be changed in the plane perpendicular to the extending direction of the cells, but such a change was expected to hardly affect the calculation result of the Young's modulus since the heat/acoustic wave conversion component of Example 1 had sufficiently high cell density. After cutting the test piece, the mass M (kg) of the test piece was measured. Then the Young's modulus (Young's modulus of the cell structure) was obtained by the formula of Young's modulus specified by the bending resonance method of JIS R1602 based on the primary resonance frequency, the mass M (kg) of the test piece and the dimensions of the test piece (length, width and thickness).

The heat/acoustic wave conversion component as stated above was manufactured as follows.

Cordierite forming raw material was used as the ceramic raw material. 1 part by mass of $SrCO_3$ as the auxiliary agent, 35 parts by mass of dispersing medium, 6 parts by mass of organic binder, and 0.5 part by mass of dispersing agent were added to 100 parts by mass of the cordierite forming raw material, followed by mixing and kneading to prepare a kneaded material. The cordierite forming raw material used included 38.9 parts by mass of talc of 3 μm in average particle diameter, 40.7 parts by mass of kaolin of 1 μm in average particle size, 5.9 parts by mass of alumina of 0.3 μm in average particle size, and 11.5 parts by mass of boehmite of 0.5 μm in average particle size. The average particle size refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die so as to manufacture a honeycomb formed body. The honeycomb formed body included cells having a substantially quadrangular shape other than at the corners (see FIG. 4), and was round as the overall shape. During this extrusion, prior to the extrusion using a regular die corresponding to the heat/acoustic wave conversion component of Example 1, the kneaded material was extruded as stated above using a dummy die of about 0.07 mm in rib thickness. Then, extrusion using the regular die was performed for the kneaded material after the extrusion using this dummy die. At this time, the ratio of water in the kneaded material used for the extrusion using the regular die was strictly controlled in the kneaded material component so that the water was 41 parts by mass (error was within ±1 part by mass) with reference to 100 parts by mass of the kneaded material solid component.

The regular die as stated above formed the cell structure and the circumferential wall monolithically, and so had both of a part to form the cell structure and a part to form the circumferential wall. The ratio d/D of the heat/acoustic wave conversion component as stated above was substantially determined by the forms of these parts of the regular die. Strictly speaking, contractions or the like during the heating/firing processing described later also affect the ratio d/D. The influences are expected small enough as compared with the influences from the forms of the parts in the regular die.

This honeycomb formed body was dried by a microwave dryer, and then was dried completely by a hot-air drier. After that, both end faces of the honeycomb formed body were cut to adjust the length of the honeycomb formed body in the extending direction of the cells. The honeycomb formed body was dried by a hot-air drier, and was fired at 1445° C. for 5 hours. Finally, the circumferential part of the honeycomb formed body after firing was cut as needed to correct the shape to be a round pillar-shape.

Through these steps, the heat/acoustic wave conversion component of the cool air/warm air generation unit in Example 1 was completed.

Next the following describes two heat exchangers of the cool air/warm air generation unit of Example 1. The two heat exchangers had the same configuration, and the following describes the heat exchanger for warm air of the two heat exchangers. The inner circumferential tube for warm air of the heat exchanger for warm air was manufactured by forming inner fins and outer fins made of the same stainless steel on the inside and the outside of a stainless steel tube, and processing these fins to have the shape of FIG. 7. The outer circumferential tube for warm air of the heat exchanger for warm air was manufactured by processing a stainless steel tube so as to surround the inner circumferential tube for warm air as in FIG. 7. The heat exchanger for cool air also was manufactured by a similar method.

That is the descriptions on the cool air/warm air generation unit in Example 1.

The housing (see the housing 15 of FIG. 3) of the cool air/warm air generation unit was manufactured by processing a stainless-steel material. For the buffer of the cool air/warm air generation unit (see the buffer 12 of FIG. 3), a buffer made of a fiber material of alumina fiber was used.

Next the following describes the acoustic wave generation unit of Example 1. The diaphragm 46 was formed by an iron thin plate. Both of the two movable metal members 44 and the two fixed metal members 45 was formed by the laminate of iron films (i.e., the laminate core). The two permanent magnets and the two coils were commercially available one made of iron. The four blade springs 41 and the four bellow members 49 were prepared by folding an iron plate, for example, into the shape of bellows (like folded curtains), so that the plates had elasticity in the direction of returning to the original plate shape. The connecting member, the two plate members, and the housing were prepared by processing a stainless steel material, for example, to have the shapes of FIG. 10. The hole sections were formed by boring these hole sections in the two plate members 48 with a drill. The size of the hole sections was adjusted so as to cut the acoustic waves with larger frequencies exceeding 500 Hz.

That is the descriptions on the acoustic wave generation unit in Example 1.

The first transmission tube and the second transmission tube of Example 1 were prepared by processing a stainless steel tube of 40 mm in inner diameter to have the shape of FIG. 2. The working fluid of Example 1 was helium gas at 10 atm.

That is the descriptions on the cool air/warm air generation system in Example 1.

In this cool air/warm air generation system of Example 1, the frequency of AC power supplied to the acoustic wave generation unit was adjusted so that the acoustic wave generation unit generated acoustic waves with the frequency of 100 Hz. The energy efficiency, the degree of compactness and the amount of noise were obtained and evaluated as follows.

(1) Energy Efficiency

The temperature and the flow rate of the external air flowing into the heat exchanger for warm air and the temperature of the warm air flowing out of the heat exchanger for warm air (the flow rate was the same as that of the external air) were measured. Heating energy H (kw) of the external air was calculated based on these measurements. Based on the AC power P (kW) supplied to the acoustic wave generation unit, the ratio H/P of the heating energy H (kW) to this AC power P (kW) was obtained. This ratio H/P was the energy efficiency. The obtained energy efficiency was evaluated as follows. When H/P<1.0, the evaluation was "D". When 1.0≤H/P<1.5, the evaluation was "C". When 1.5≤H/P<2.0, the evaluation was "B". When 2.0≤H/P, the evaluation was "A".

(2) Degree of Compactness

The volume V of the heat/acoustic wave conversion component as stated above was obtained by V=(diameter D of a cross section of the heat/acoustic wave conversion component as a whole)$^2$×π×(length L of a cross section of the heat/acoustic wave conversion component as a whole)/4=(50 mm)$^2$×π×(50 mm)/4=98125 mm$^3$. The ratio H/V of the heating energy H (kW) to this volume V was obtained. This ratio H/V was the degree of compactness. The obtained degree of compactness was evaluated as follows. When H/V<0.3 (kw/mm$^3$), the evaluation was "D". When 0.3 (kw/mm$^3$)≤H/V<0.5 (kw/mm$^3$), the evaluation was "C". When 0.5 (kw/mm$^3$)≤H/V<2.0 (kw/mm$^3$), the evaluation was "B". When 2.0 (kw/mm$^3$)≤H/V, the evaluation was "A".

(3) Amount of Noise

The amount of noise (dB) from the cool air/warm air generation system was measured with a noise meter disposed at a distance of 1 m from the heat/acoustic wave conversion component. When the amount of noise was 70 dB or more, the evaluation was "D". When the amount of noise was 50 dB or more and less than 70 dB, the evaluation was "C". When the amount of noise was 45 dB or more and less than 50 dB, the evaluation was "B". When the amount of noise was less than 45 dB, the evaluation was "A".

The evaluations "A" through "D" for the energy efficiency, the degree of compactness and the amount of noise as stated above are indices representing user's sensory recognitions. Among the evaluations "A" through "D", "D" corresponds to the situation having serious problems in practical use and being inadequate, and "A" to "C" correspond to the practically usable situation. Particularly "C" among the evaluations "A" through "C" corresponds to the usable situation having some recognizable problems, "B" corresponds to the situation hardly having recognizable problems in practical use, and "A" corresponds to the situation without problems at all and recognized as good.

Examples 2 to 3, Comparative Examples 1 to 2

The cool air/warm air generation systems of Examples 2 to 3 and Comparative Examples 1 to 2 were prepared by the same method as the above Example 1 except that the die used for extrusion of the heat/acoustic wave conversion component was different. These cool air/warm air generation systems were different from Example 1 only in the value of cell density of the cell-structured region of the heat/acoustic wave conversion component. The energy efficiency, the degree of compactness and the amount of noise were obtained and evaluated by a method similar to Example 1.

The following Table 1 shows the evaluation results of Examples 1 to 3 and Comparative Examples 1 to 2 as well as the values of characteristic parameters as stated above of these Examples and Comparative Examples.

TABLE 1

|  | cell density (cells/cm$^2$) | heat conductivity (W/mK) | diameter ratio d/D | working fluid pressure (atm)/ working fluid type | frequency (Hz) | energy efficiency | compactness | noise amount |
|---|---|---|---|---|---|---|---|---|
| Ex. 1 | 775 | 1.0 | 0.9 | 10/He | 100 | A | A | A |
| Ex. 2 | 3100 | 1.0 | 0.9 | 10/He | 100 | B | B | B |
| Ex. 3 | 620 | 1.0 | 0.9 | 10/He | 100 | B | B | A |
| Comp. Ex. 1 | 3150 | 1.0 | 0.9 | 10/He | 100 | C | C | D |
| Comp. Ex. 2 | 500 | 1.0 | 0.9 | 10/He | 100 | D | D | A |

As is understood from comparisons between Examples 1 to 3 and Comparative Example 2 in Table 1, Examples 1 to 3 had very high energy efficiency and degree of compactness as compared with Comparative Example 2. This shows that the cell density being 620 cells/cm$^2$ or more is required to exert sufficient high energy efficiency and sufficient high degree of compactness. As is understood from comparisons between Examples 1 to 3 and Comparative Example 1, Examples 1 to 3 had very low amount of noise and high energy efficiency and degree of compactness as compared with Comparative Example 1. This shows that the cell density being 3100 cells/cm$^2$ or less is required to exert high energy efficiency, high degree of compactness and a good effect of reducing noise.

Examples 4 to 5, Comparative Example 3

The cool air/warm air generation systems of Examples 4 to 5 and Comparative Example 3 were prepared by the same method as the manufacturing method of the heat/acoustic wave conversion component of Example 1 as stated above except that the ceramic raw materials were different. These cool air/warm air generation systems were different from Example 1 only in the heat conductivity of the materials of the partition wall and the circumferential wall of the heat/acoustic wave conversion component. Specifically Examples 4 to 5 and Comparative Example 3 included different ratios of talc, kaolin, alumina and boehmite from that of Example 1 so as to have different heat conductivity from that of Example 1.

The following Table 2 shows the evaluation results of Examples 1, 4 to 5 and Comparative Example 3 as well as the values of characteristic parameters as stated above of these Examples and Comparative Examples.

As is understood from comparisons between Examples 1, 7 to 9, Examples 1 and 8 were evaluated as "A" for all of the energy efficiency, the degree of compactness and the amount of noise, and were good for overall results as compared with Examples 7 and 9. This shows that the ratio d/D being 0.8 or more and 0.9 or less is more preferable to exert high energy efficiency, high degree of compactness, and a good effect of reducing noise.

TABLE 2

| | cell density (cells/cm$^2$) | heat conductivity (W/mK) | Diameter ratio d/D | working fluid pressure (atm)/ working fluid type | frequency (Hz) | energy efficiency | compactness | noise amount |
|---|---|---|---|---|---|---|---|---|
| Ex. 1 | 775 | 1.0 | 0.9 | 10/He | 100 | A | A | A |
| Ex. 4 | 775 | 0.5 | 0.9 | 10/He | 100 | A | A | A |
| Ex. 5 | 775 | 5.0 | 0.9 | 10/He | 100 | A | A | A |
| Comp. Ex. 3 | 775 | 8.0 | 0.9 | 10/He | 100 | D | D | A |

As is understood from comparisons between Examples 1, 4 to 5 and Comparative Example 3 in Table 2, Examples 1, 4 to 5 had very high energy efficiency and degree of compactness as compared with Comparative Example 3. This shows that the heat conductivity being 5.0 (W/mK) or less is required to exert sufficient high energy efficiency and sufficient high degree of compactness.

Examples 6 to 11

The cool air/warm air generation systems of Examples 6 to 11 were prepared by the same method as the above Example 1 except that the die used for extrusion of the heat/acoustic wave conversion component was different. These cool air/warm air generation systems had the same diameter d (=45 mm) of the cell-structured region of the heat/acoustic wave conversion component as that of Example 1, and had different diameters D of a cross section of the heat/acoustic wave conversion component as a whole, i.e., had different ratios d/D. The energy efficiency, the degree of compactness and the amount of noise were obtained and evaluated by a method similar to Example 1.

The following Table 3 shows the evaluation results of Examples 1, 6 to 11 as well as the values of characteristic parameters as stated above of these Examples.

Examples 12 to 15

The cool air/warm air generation system of Example 12 was prepared by the same method as that of Example 1 as stated above except that the acoustic wave generation unit generated acoustic waves with different frequencies. Specifically the acoustic wave generation unit of Example 12 generated acoustic waves with the frequency of 200 Hz. The cool air/warm air generation systems of Examples 13 to 15 were prepared by the same method as that of Example 12 except that the ceramic raw material used for the heat/ acoustic wave conversion component was different. These cool air/warm air generation systems were different from Example 12 only in the Young's modulus of the cell structure of the heat/acoustic wave conversion component. Examples 13 to 15 included a different amount of SrCO$_3$ that was added as the auxiliary agent in Example 12 while adjusting the particle diameter of each component of the

TABLE 3

| | cell density (cells/cm$^2$) | heat conductivity (W/mK) | diameter ratio d/D | working fluid pressure (atm)/ working fluid type | frequency (Hz) | energy efficiency | compactness | noise amount |
|---|---|---|---|---|---|---|---|---|
| Ex. 1 | 775 | 1.0 | 0.9 | 10/He | 100 | A | A | A |
| Ex. 6 | 775 | 1.0 | 0.5 | 10/He | 100 | C | C | A |
| Ex. 7 | 775 | 1.0 | 0.6 | 10/He | 100 | B | B | A |
| Ex. 8 | 775 | 1.0 | 0.8 | 10/He | 100 | A | A | A |
| Ex. 9 | 775 | 1.0 | 0.94 | 10/He | 100 | A | A | B |
| Ex. 10 | 775 | 1.0 | 0.96 | 10/He | 100 | B | A | C |
| Ex. 11 | 775 | 1.0 | 0.98 | 10/He | 100 | B | A | C |

As is understood from comparisons between Examples 1, 7 to 11 in Table 3, Examples 1, 7 to 9 had very low amount of noise as compared with Examples 10 to 11. This shows that the ratio d/D being 0.94 or less is preferable to exert a good effect of reducing noise. As is understood from comparisons between Examples 1, 6 to 9 in Table 3, Examples 1, 7 to 9 had high energy efficiency and degree of compactness as compared with Example 6. This shows that the ratio d/D being 0.6 or more is preferable to exert high energy efficiency and high degree of compactness. In summary, the ratio d/D being 0.6 or more and 0.94 or less is preferable to exert high energy efficiency, high degree of compactness, and a good effect of reducing noise.

cordierite forming raw material, so that the Young's modulus only was different from that of Example 12 without changing the heat conductivity very much.

For the cool air/warm air generation systems of Examples 12 to 15, an experiment was conducted to generate acoustic waves with the frequency of 200 Hz for 200 hours while supplying the AC power P (kW) of 1 kW to the acoustic wave generation unit. Then the degree of degradation of the heat/acoustic wave conversion components (volume % of the degraded part) was evaluated after the experiment. The following Table 4 shows the evaluation results as well as the values of characteristic parameters as stated above of these Examples.

TABLE 4

|        | cell density (cells/cm²) | heat conductivity (W/mK) | diameter ratio d/D | Young's modulus (GPa) | working fluid pressure (atm)/ working fluid type | frequency (Hz) | degradation rate (%) |
|--------|---|---|---|---|---|---|---|
| Ex. 12 | 775 | 1.0 | 0.9 | 13 | 10/He | 200 | 10 |
| Ex. 13 | 775 | 1.0 | 0.9 | 5  | 10/He | 200 | 80 |
| Ex. 14 | 775 | 1.0 | 0.9 | 7  | 10/He | 200 | 20 |
| Ex. 15 | 775 | 1.0 | 0.9 | 11 | 10/He | 200 | 15 |

As is understood from comparisons between Examples 12 to 15 in Table 4, Examples 12, 14 to 15 had very low degree of degradation as compared with Example 13. This shows that the Young's modulus being 7 GPa or more is preferable to exert good durability against acoustic waves. As is understood from comparisons between Examples 12, 14 to 15, Examples 12 and 15 had lower degree of degradation than that of Example 14. This shows that the Young's modulus being 11 GPa or more is more preferable to exert particularly good durability against acoustic waves.

Reference Comparative Examples 1 to 2

The cool air/warm air generation system of Reference Comparative Example 1 was prepared by the same method as the above Example 1 except that the heat/acoustic wave conversion component was not a honeycomb structure but a porous body having the same size as that of the honeycomb structure of Example 1. This porous body was manufactured by extrusion using the same material as that of the honeycomb structure except that a pore former was added to this porous body. The amount of the pore former to manufacture this porous body was adjusted so that the total sum of the opening area of the pores that open in a cross section perpendicular to the longitudinal direction of this porous body was substantially the same as the total sum of the opening area of the cells in the cell structure of the heat/acoustic wave conversion component as the honeycomb structure in Example 1. The cool air/warm air generation system of Reference Comparative Example 2 was prepared by the same method as the above Example 1 except that the heat/acoustic wave conversion component was not a honeycomb structure but a mesh body having the same size as that of the honeycomb structure of Example 1. This mesh body was manufactured by preparing mesh plates made of the same material as that of the honeycomb structure and stacking these mesh plates so that the openings of the mesh plates were aligned. The size of the openings in the mesh of this mesh body was adjusted so that the total sum of the opening area of the openings was substantially the same as the total sum of the opening area of the cells in the cell structure of the heat/acoustic wave conversion component as the honeycomb structure in Example 1. The energy efficiency, the degree of compactness and the amount of noise of these Reference Comparative Examples 1 and 2 were obtained and evaluated by a method similar to Example 1.

Both of Reference Comparative Examples 1 and 2 were evaluated as "D" for the energy efficiency, "D" for the degree of compactness and "A" for the amount of noise. This shows that a heat/acoustic wave conversion component having a honeycomb structure is necessary to exert sufficient high energy efficiency and sufficient high degree of compactness.

Examples 16 to 18, Comparative Example 4

The cool air/warm air generation system of Examples 16 to 18 and Comparative Example 4 were prepared by the same method as that of Example 1 as stated above except that the pressure of the working fluid was different. The energy efficiency, the degree of compactness and the amount of noise were obtained and evaluated by a method similar to Example 1.

Example 19

The cool air/warm air generation system of Example 19 was prepared by the same method as that of Example 18 as stated above except that air was used as the working fluid instead of helium. The energy efficiency, the degree of compactness and the amount of noise were obtained and evaluated by a method similar to Example 1.

The following Table 5 shows the evaluation results of Examples 1, 16 to 19 and Comparative Example 4 as well as the values of characteristic parameters as stated above of these Examples and Comparative Example.

TABLE 5

|  | cell density (cells/cm²) | heat conductivity (W/mK) | diameter ratio d/D | working fluid pressure (atm)/ working fluid type | frequency (Hz) | energy efficiency | compactness | noise amount |
|---|---|---|---|---|---|---|---|---|
| Ex. 1 | 775 | 1.0 | 0.9 | 10/He | 100 | A | A | A |
| Ex. 16 | 775 | 1.0 | 0.9 | 35/He | 100 | A | A | C |
| Ex. 17 | 775 | 1.0 | 0.9 | 5/He | 100 | A | A | A |
| Ex. 18 | 775 | 1.0 | 0.9 | 1/He | 100 | B | B | A |
| Ex. 19 | 775 | 1.0 | 0.9 | 1/air | 100 | C | C | A |
| Comp. Ex. 4 | 775 | 1.0 | 0.9 | 36/He | 100 | A | A | D |

As is understood from comparisons between Examples 1, 16 to 19 and Comparative Example 4 in Table 5, Examples 1, 16 to 19 had very low amount of noise as compared with Comparative Example 4. This shows that the pressure of the working fluid being 35 atm or less is necessary to reduce noise. As is understood from comparisons between Example 18 and Example 19 in Table 5, Example 18 had higher energy efficiency and degree of compactness than those of Example 19. This shows that rare gas, such as helium, being less reactive than air is preferable for the working fluid to exert high energy efficiency and high degree of compactness.

Reference Examples 1 to 5 and Reference Comparative Example 3

For reference, a cool air/warm air generation system was prepared having the configuration of Example 1 and including a linear transmission tube 100C' and a loop-like transmission tube 100D' as shown in FIG. 11 instead of the two transmission tubes 100C and 100D (see FIG. 2) having a loop shape. Then the energy efficiency, the degree of compactness and the amount of noise of this cool air/warm air generation system were obtained and evaluated under the conditions of the pressure and types of the working fluid similar to Examples 1, 16 to 19 and Comparative Example 4. Based on the pressure and types of the working fluid, this type of cool air/warm air generation system of FIG. 11 was called Reference Example 1 (helium of 10 atm in pressure), Reference Example 2 (helium of 25 atm in pressure), Reference Example 3 (helium of 5 atm in pressure), Reference Example 4 (helium of 1 atm in pressure), Reference Example 5 (air of 1 atm in pressure), and Reference Comparative Example 3 (helium of 35 atm in pressure), The cool air/warm air generation systems of Reference Examples 1 to 5 and Reference Comparative Example 3 had a different shape of the transmission tubes from that of the cool air/warm air generation system of Example 1 and had the shape of FIG. 11, but the inner diameter and the material of the transmission tubes were the same. The cool air/warm air generation systems of Reference Examples 1 to 5 and Reference Comparative Example 3 were different from the cool air/warm air generation system of Example 1 in the acoustic wave generation unit as well, and included the acoustic wave generation unit of FIG. 13. Note here that this acoustic wave generation unit substantially had the configuration obtained simply by removing the two blade springs 41 on the left of FIG. 10, the diaphragm 46, the connecting member 47, and the one plate member 48 on the left of FIG. 10 as well as the two bellow members 49 on the left of FIG. 10 from the acoustic wave generation unit (see FIG. 10) of Example 1, closing the connecting part of the housing 40 with the first transmission tube 100C and replacing some components on the right of the acoustic wave generation unit. Specifically the one plate member 48 on the right of FIG. 10 was just connected to two movable metal members 44 via two connecting members 47' of FIG. 13, and the two blade springs 41 on the right of FIG. 10 are connected to the plate member 48 as stated above (see FIG. 13). As a result, Reference Examples 1 to 5 and Reference Comparative Example 3 had a substantially similar configuration and such functions to those of Examples 1, 16 to 19 and Comparative Example 4 except that the shape of the transmission tubes was different.

Actually the evaluation results of Reference Examples 1 to 5 and Reference Comparative Example 3 were exactly the same as the evaluation results of Examples 1, 16 to 19 and Comparative Example 4 in Table 5. This also shows that the pressure of the working fluid being 35 atm or less is necessary to reduce noise. This also shows that rare gas, such as helium, being less reactive than air is preferable for the working fluid to exert high energy efficiency and high degree of compactness.

Reference Example 6

For reference, a cool air/warm air generation system of Reference Example 6 was prepared including a linear transmission tube 100C" as shown in FIG. 14 instead of the two transmission tubes 100C and 100D (see FIG. 2) having a loop-shape. Then the energy efficiency, the degree of compactness and the amount of noise of this cool air/warm air generation system were obtained and evaluated under the conditions of the pressure and the type of the working fluid similar to Example 1 (helium of 10 atm in pressure).

Reference Example 6 was evaluated as "B" for the energy efficiency, "B" for the degree of compactness and "A" for the amount of noise. Reference Example 6 was rated somewhat lower than Example 1 for the energy efficiency and the degree of compactness, because Reference Example 6 generated a thermoacoustic effect using standing waves and not traveling waves as in Example 1, and heat/acoustic wave conversion typically progresses less in standing waves than in traveling waves.

Examples 20 to 21, Comparative Examples 5 to 6

The cool air/warm air generation system of Example 12 as stated above and new cool air/warm air generation systems of Examples 20 to 21 were prepared by the same method as that of Example 1 as stated above except that their acoustic wave generation units generated acoustic waves with different frequencies. The cool air/warm air generation systems of Comparative Examples 5 to 6 were prepared by a method similar to that of Example 1 as stated above, and these cool air/warm air generation systems were different from Example 1 in that the acoustic wave generation units did not have a frequency filtering function that the acoustic wave generation unit 101B of FIG. 10 had, the acoustic wave generation units included the oscillation system whose natural frequency was not adjusted as stated above referring to FIG. 9, and the acoustic wave generation units generated acoustic waves with different frequencies. Although the acoustic wave generation units of Comparative Examples 5 to 6 had a configuration similar to that of the acoustic wave generation unit 100B of FIG. 9 except that the natural frequency of the oscillation system was not adjusted, the acoustic wave generation unit of Comparative Example 5 generated acoustic waves with a higher frequency of 550 Hz and the acoustic wave generation unit of Comparative Example 6 generated acoustic waves with a lower frequency of 30 Hz. The energy efficiency, the degree of compactness and the amount of noise of these Examples 12, 20 to 21 and Comparative Examples 5 to 6 were obtained and evaluated by a method similar to Example 1.

The following Table 6 shows the evaluation results of Examples 1, 12, 20 to 21 and Comparative Examples 5 to 6 as stated above as well as the values of characteristic parameters as stated above of these Examples and Comparative Example.

TABLE 6

|  | cell density (cells/cm²) | heat conductivity (W/mK) | diameter ratio d/D | working fluid pressure (atm)/ working fluid type | frequency (Hz) | energy efficiency | compactness | noise amount |
|---|---|---|---|---|---|---|---|---|
| Ex. 1 | 775 | 1.0 | 0.9 | 10/He | 100 | A | A | A |
| Ex. 12 | 775 | 1.0 | 0.9 | 10/He | 200 | A | A | A |
| Ex. 20 | 775 | 1.0 | 0.9 | 10/He | 50 | C | C | A |
| Ex. 21 | 775 | 1.0 | 0.9 | 10/He | 500 | A | A | C |
| Comp. Ex. 5 | 775 | 1.0 | 0.9 | 10/He | 550 | A | A | D |
| Comp. Ex. 6 | 775 | 1.0 | 0.9 | 10/He | 30 | D | D | A |

As is understood from comparisons between Examples 1, 12, and 20 to 21 and Comparative Example 5 in Table 6, Examples 1, 12, 20 to 21 had very low amount of noise as compared with Comparative Example 5. This shows that the frequency of acoustic waves generated by the acoustic wave generation unit being 500 Hz or less is necessary to reduce noise. As is understood from comparisons between Examples 1, 12, 20 to 21 and Comparative Example 6 in Table 6, Examples 1, 12, 20 to 21 had very high energy efficiency and degree of compactness as compared with Comparative Example 6. This shows that the frequency of acoustic waves generated by the acoustic wave generation unit being 50 Hz or more is necessary to exert high energy efficiency and high degree of compactness. In summary, the frequency of acoustic waves generated by the acoustic wave generation unit being 50 Hz or more and 500 Hz or less is necessary to exert sufficient high energy efficiency and sufficient high degree of compactness and to reduce noise sufficiently.

As is understood from comparisons between Examples 1, 12, and 20 to 21 in Table 6, Example 1 and Example 12 had higher energy efficiency and degree of compactness than those of Example 20, and had lower amount of noise than that of Example 21. This shows that the frequency of acoustic waves generated by the acoustic wave generation unit being 100 Hz or more and 200 Hz or less is preferable to exert high energy efficiency and high degree of compactness and to reduce noise sufficiently.

The following experiment was conducted for reference experiment to confirm the effect from the frequency-filtering function. Firstly two cool air/warm air generation systems were newly prepared, having a configuration similar to that of the cool air/warm air generation systems of Comparative Examples 5 to 6 as stated above, and including the acoustic wave generation unit 101B of FIG. 10 having a frequency-filtering function. Then AC power was supplied to these two new cool air/warm air generation systems. The AC power had the same frequency as that of the AC power supplied to the cool air/warm air generation systems of Comparative Examples 5 to 6 so as to generate acoustic waves of the frequencies in Table 6. These two new cool air/warm air generation systems were examined about whether acoustic waves were generated or not. The result shows that these cool air/warm air generation systems hardly generated acoustic waves. This shows that the acoustic wave generation unit 101B of FIG. 10 having a frequency-filtering function enables cutting of high frequencies higher than 500 Hz and low frequencies lower than 50 Hz.

Reference Comparative Example 4

For reference, the cool air/warm air generation system of Reference Comparative Example 4 was prepared, which included a speaker as the acoustic wave generation unit instead of the linear-motor type acoustic wave generation unit (see FIG. 10) of Example 1. This speaker was configured to receive the AC power having the same intensity as the linear-motor type acoustic wave generation unit (see FIG. 10) in Example 1 and generate acoustic waves of 100 Hz having the same acoustic-wave energy as that of the linear-motor type acoustic wave generation unit (see FIG. 10) in Example 1.

As compared with the linear-motor type acoustic wave generation unit (see FIG. 10) in Example 1, the speaker of Reference Comparative Example 4 occupied a wider area in the plane perpendicular to the traveling direction of acoustic waves. As a result, the acoustic wave generation unit occupied a large area, meaning a larger cool air/warm air generation system. This shows that a cool air/warm air generation system preferably includes a linear-motor type acoustic wave generation unit and not a speaker.

INDUSTRIAL APPLICABILITY

The present invention is useful to implement a cool air/warm air generation system for cooling and heating electric vehicles having a compact size of the system as a whole, achieving high energy-efficiency and suppressing noise.

DESCRIPTION OF REFERENCE NUMERALS

1, 1': heat/acoustic wave conversion component, 11: partition wall, 12: buffer, 13: circumferential wall, 14: cell, 15: housing, 16: segment, 17: bonding part, 2, 2': heat exchanger for warm air, 21: inner fin, 21': slit for external air, 22: outer fin, 22': slit for working fluid, 23: inner circumferential tube for warm air, 24: outer circumferential tube for warm air, 25: heat insulator, 3: heat exchanger for cool air, 31: inner fin, 32: outer fin, 33: inner circumferential tube for cool air, 40, 40': housing, 41, 41': blade spring, 42: coil, 43: permanent magnet, 43a: N-pole part, 43b: S-pole part, 44: movable metal member, 45: fixed metal member, 46: diaphragm, 47, 47': connecting member, 48, 48': plate member, 49, 49': bellow member, 50,50': hole section, 100: cool air/warm air generation system, 100A: cool air/warm air generation unit, 100B, 100B', 101B, 101B': acoustic wave generation unit, 100C: first transmission tube, 100C', 100C": linear transmission tube, 100D: second transmission tube, 100D': loop-like transmission tube, 100D": volume part, 100E: first external-air tube, 100F: second external-air tube, 100G: cool-air tube, 10011: warm-air tube, 101,102,103: cool air/warm air generation system, 200, 200': controller, 201: cabin, 301: second valve, 302: first valve, 303: second air-blower, 304: first air-blower, 305: power supplying unit, 306: second valved external-air tube, 307: second inflow tube, 308: second communication tube, 309: first outflow tube, 310: second outflow tube, 311: first inflow tube, 312: first valved external-air tube, 313: first communication tube, 1000, 1000': electric vehicle

What is claimed is:

1. A cool air/warm air generation system to cool and heat a cabin of an electric vehicle, comprising:
an acoustic wave generation unit that includes a linear motor which receives AC power and generates a vibration force in a linear direction, the acoustic wave generation unit oscillating working fluid, that has a pressure of 35 atm or less and oscillates to transmit acoustic waves, with the linear motor so as to generate acoustic waves with a frequency in a range from 50 Hz or more and 500 Hz or less and in accordance with the frequency of the AC power;
a transmission tube that is filled with the working fluid, and transmits acoustic waves generated at the acoustic wave generation unit with oscillations of the working fluid; and
a cool air/warm air generation unit that obtains first external air and second external air from an outside of the electric vehicle and gives heat of the first external air to the second external air via acoustic waves transmitted through the transmission tube so as to change the first external air into cool air with a decreased temperature and change the second external air into warm air with an increased temperature, wherein
the cool air/warm air generation unit includes:
a heat/acoustic wave conversion component that has a partition wall which defines a plurality of cells extending between two end faces of the heat/acoustic wave conversion component and having inside thereof being filled with the working fluid, the heat/acoustic wave conversion component mutually converting heat exchanged between the partition wall and the working fluid and energy of acoustic waves resulting from oscillations of the working fluid;
a heat exchanger for cool air that is disposed close to one of the two end faces of the heat/acoustic wave conversion component and that receives heat from the first external air flowing into the heat exchanger for cool air and gives the heat to the one end face of the heat/acoustic wave conversion component so as to flow out the cold air; and
a heat exchanger for warm air that is disposed close to the other end face of the heat/acoustic wave conversion component and that receives heat from the other end face and gives the heat to the second external air flowing into the heat exchanger for warm air so as to flow out the warm air,
wherein the heat/acoustic wave conversion component has a cell density of 620 cells/cm$^2$ or more and 3100 cells/cm$^2$ or less of a cell-structured region occupied by a cross section of the partition wall and a cross section of the cells in a cross section perpendicular to the extending direction of the cells, and
a material of the partition wall has heat conductivity of 5.0 W/mK or less.

2. The cool air/warm air generation system according to claim 1, wherein the heat/acoustic wave conversion component includes a circumferential wall that connects circumferential parts of the two end faces so as to surround the partition wall as a whole and so defines a lateral part of the heat/acoustic wave conversion component, and
a ratio of an equivalent circle diameter of the cell-structured region to an equivalent circle diameter of the cross section of the heat/acoustic wave conversion component is 0.6 or more and 0.94 or less.

3. The cool air/warm air generation system according to claim 2, wherein the ratio is 0.8 or more and 0.9 or less.

4. The cool air/warm air generation system according to claim 2, wherein the circumferential wall is monolithic with the partition wall.

5. The cool air/warm air generation system according to claim 1, wherein a cell structure body, that is a portion of the whole of the heat/acoustic wave conversion component in which a cell structure is formed by the partition wall and the cells, has a Young's modulus of 7 GPa or more.

6. The cool air/warm air generation system according to claim 1, wherein the acoustic wave generation unit includes a sealing oscillation member that has a hole section which forms a through hole, and that seals the transmission tube other than the hole section and receives a vibration force generated by the linear motor to oscillate in the linear direction, wherein
the hole section forms, as the through hole, a through hole whose size enables the hole section to exert a frequency-filtering function such that;
when the sealing oscillation member oscillates with a high frequency higher than 500 Hz or with a low frequency lower than 50 Hz, the hole section allows the working fluid to enter the hole section or to pass through the hole section so as to suppress oscillations of the working fluid with the high frequency or the low frequency, and
when the sealing oscillation member oscillates with a frequency in a range of 50 Hz or more and 500 Hz or less, the hole section allows oscillation of the working fluid at the frequency in the range.

7. The cool air/warm air generation system according to claim 1, wherein the acoustic wave generation unit selectively executes;
a heating mode in which the acoustic wave generation unit generates acoustic waves traveling from the one end face to the other end face of the heat/acoustic wave conversion component through the cells of the heat/acoustic wave conversion component, and
a cooling mode in which the acoustic wave generation unit generates acoustic waves traveling from the other end face to the one end face of the heat/acoustic wave conversion component through the cells of the heat/acoustic wave conversion component, and
the cool air/warm air generation unit selectively executes;
a driving mode in which the cool air/warm air generation unit obtains the first external air from the outside of the electric vehicle and obtains first cabin air instead of the second external air, and
a ventilation mode in which the cool air/warm air generation unit obtains the second external air from the outside of the electric vehicle and obtains second cabin air instead of the first external air, wherein
when the acoustic wave generation unit executes the heating mode and the cool air/warm air generation unit executes the driving mode, the heat exchanger for cool air receives heat from the first external air and gives the heat to the one end face, and flows out air that corresponds to the first external air after giving the heat to the heat exchanger for cool air to the outside of the electric vehicle, and the heat exchanger for warm air receives the heat of the first external air from the other end face via acoustic waves and gives the heat to the first cabin air, and flows out air that corresponds to the first cabin air after receiving the heat into the cabin of the electric vehicle, when the acoustic wave generation unit executes the heating mode and the cool air/warm air generation unit executes the ventilation mode, the heat exchanger for cool air receives heat from the second cabin air and gives the heat to the one end face, and flows out air that corresponds to the second cabin air after giving the heat to the heat exchanger for cool air to the outside of the electric vehicle, and the heat exchanger for warm air receives the heat of the second cabin air from the other end face via acoustic waves and gives the heat to the second external air, and flows out air that corresponds to the second external air after receiving the heat into the cabin of the electric vehicle, when the acoustic wave generation unit executes the cooling mode and the cool air/warm air generation unit executes the driving mode, the heat exchanger for warm air receives heat from the first cabin air and gives the heat to the other end face, and flows out air that corresponds to the first cabin air after giving the heat to the heat exchanger for warm air into the cabin of the electric vehicle, and the heat exchanger for cool air receives the heat of the first cabin air from the one end face via acoustic waves and gives the heat to the first external air, and flows out air that corresponds to the first external air after receiving the heat to the outside of the electric vehicle, and when the acoustic wave generation unit executes the cooling mode and the cool air/warm air generation unit executes the ventilation mode, the heat exchanger for warm air receives heat from the second external air and gives the heat to the other end face, and flows out air that corresponds to the second external air after giving the heat to the heat exchanger for warm air into the cabin of the electric vehicle, and the heat exchanger for cool air receives the heat of the second external air from the one end face via acoustic waves and gives the heat to the second cabin air, and flows out air that corresponds to the second cabin air after receiving the heat to the outside of the electric vehicle.

* * * * *